United States Patent [19]
Fukasawa

[11] Patent Number: 6,086,166
[45] Date of Patent: Jul. 11, 2000

[54] BRAKING TORQUE CONTROL SYSTEM AND METHOD FOR WHEELED VEHICLE HAVING REGENERATIVE BRAKING TORQUE GENERATOR AND FRICTIONAL BRAKING TORQUE GENERATOR

[75] Inventor: Tsukasa Fukasawa, Aichi-ken, Japan

[73] Assignee: Toyota Jidosha Kabushiki Kaisha, Toyota, Japan

[21] Appl. No.: 09/094,483

[22] Filed: Jun. 10, 1998

[30] Foreign Application Priority Data

Jun. 10, 1997 [JP] Japan ................................ 9-152482

[51] Int. Cl.[7] ...................................................... B60T 8/64
[52] U.S. Cl. ......................... 303/152; 303/3; 303/122.04
[58] Field of Search ................................... 303/152, 122, 303/112, 3, 122.13, 122.12, 122.08, 122.04, 122.05; 180/65.2, 65.3, 65.8; 318/376

[56] References Cited

U.S. PATENT DOCUMENTS

| | | |
|---|---|---|
| 5,378,053 | 1/1995 | Patient et al. .............................. 303/3 |
| 5,423,600 | 6/1995 | Riddiford et al. ........................... 303/3 |
| 5,450,324 | 9/1995 | Cikanek ...................................... 303/3 |
| 5,568,962 | 10/1996 | Enomoto et al. ............................ 303/3 |
| 5,769,509 | 6/1998 | Feigel et al. ............................. 303/152 |
| 5,775,784 | 7/1998 | Koga et al. .............................. 303/152 |

FOREIGN PATENT DOCUMENTS 7-205800   8/1995   Japan .

*Primary Examiner*—Robert J. Oberleitner
*Assistant Examiner*—Mariano Sy
*Attorney, Agent, or Firm*—Oliff & Berridge, PLC

[57] ABSTRACT

A braking torque control system has a regenerative braking torque generator and a frictional braking torque generator and can control a total braking torque when there is failure in exchanging data between the regenerative braking torque generator and the hydraulic braking torque generator. In particular, when there is an abnormality in the exchanging of data, the target regenerative braking torque is reduced.

22 Claims, 11 Drawing Sheets

BRAKING TORQUE CONTROL SYSTEM AND METHOD FOR WHEELED VEHICLE HAVING REGENERATIVE BRAKING TORQUE GENERATOR AND FRICTIONAL BRAKING TORQUE GENERATOR

BACKGROUND OF THE INVENTION

1. Field of Invention

This invention relates to a braking torque control system for a wheeled vehicle that has a regenerative braking torque generator and a frictional braking torque generator.

2. Description of Related Art

Braking systems having a regenerative braking torque generator and a frictional braking torque generator are known. A regenerative braking torque generator gives wheels regenerative braking torque, for example, by regenerative brake action of an electric motor connected to the wheels. A frictional braking torque generator gives wheels frictional braking torque, for example, by pressing friction devices on brake rotors rotating with the wheels. An example of such a braking torque control system is disclosed in Japanese Laid-Open Patent Application No. 7-205800. This system has a regenerative braking torque generator and a hydraulic braking torque controller that functions as a frictional braking torque generator. This system generates target total braking torque on the basis of exchanging data between the regenerative braking torque generator and the hydraulic braking torque controller. In this system, when the regenerative braking torque generator fails, the regenerative braking torque is controlled to zero and the hydraulic braking torque is controlled to the target total braking torque. This system does not describe any method of controlling the system when there is a failure of the exchanging of data between the regenerative braking torque generator and the hydraulic braking torque controller.

SUMMARY OF THE INVENTION

It is an object of the present invention to provide a braking torque control system having a regenerative braking torque generator and a frictional braking torque generator and that can control the total braking torque when there is a failure in the exchanging of data between the regenerative braking torque generator and the hydraulic braking torque controller.

According to one aspect of the invention, a controller functions as a regenerative braking torque-reducing device to reduce the regenerative braking torque generated by the regenerative braking torque generator when there is failure of the exchanging of data. The braking torque control system also includes a regenerative braking torque generator that provides regenerative braking torque to wheels by regenerative brake action of an electric motor connected to the wheels. Additionally, a frictional braking torque generator provides frictional braking torque to the wheels by pressing friction devices on brake rotors (or other elements) rotating with the wheels. The total braking torque, which is a combination of the regenerative braking torque and the frictional braking torque, is controlled by the controller to become a target total braking torque on the basis of exchanging data between the regenerative braking torque generator and the frictional braking torque generator.

When the condition of exchanging data between the regenerative braking torque generator and the frictional braking torque generator is normal, the total braking torque can be controlled to become the target torque by combining the regenerative braking torque and the frictional braking torque. The target torque refers to the total braking torque desired by the vehicle operator (hereinafter 'desired braking torque') or to the total braking torque determined as an optimum amount in automatic brake control (hereinafter 'optimum braking torque'), e.g., on the basis of a relationship between a coefficient of the road surface friction and a movable load (ABS) or for performing automatic stop (a safety feature).

On the other hand, when the condition of exchanging data is abnormal, it is difficult to control the total braking torque to become the target torque by combining the regenerative braking torque and the frictional braking torque. Therefore, one can consider controlling the total braking torque to become either the regenerative braking torque or the frictional braking torque. However, the total torque controlled by only the regenerative braking torque tends to be incomplete and it cannot completely stop the vehicle. Accordingly, it is preferable to provide the total braking torque to the wheels by only using the frictional braking torque. Thus, according to one aspect of the present invention, the regenerative braking torque is reduced when there is failure of exchanging data. The reducing rate can vary or be constant.

It is preferable to reduce the regenerative braking torque to zero in order to most accurately control braking of the vehicle. In practice, however, it is possible to leave some amount of the regenerative braking torque. For example, a relatively small amount of the regenerative braking torque can be left during failure of the exchanging data and, therefore, a battery can be charged minimally. In such a case, the control of the total braking torque is slightly imperfect and the total braking torque does not completely equal the total target braking torque. This does not present a problem because the operator becomes accustomed to it quickly.

Failure can occur in the exchange of many types of data. One type of data refers to target regenerative braking torque, which is transmitted to the regenerative braking torque generator from the frictional braking torque generator. Additionally, data referring to actual regenerative braking torque is transmitted to the frictional braking torque generator from the regenerative braking torque generator. Regenerative braking torque is controlled to reach the target regenerative braking torque transmitted to the regenerative braking torque generator and frictional braking torque is controlled to reach the target frictional braking torque determined on the basis of the actual regenerative braking torque transmitted to the frictional braking torque generator. Reduction of the regenerative braking torque is achieved by reducing the target regenerative braking torque or by controlling in the regenerative braking torque generator.

Another type of exchanging data is data referring to target frictional braking torque, which is transmitted to the frictional braking torque generator from the regenerative braking torque generator. Additionally, data referring to the actual frictional braking torque is transmitted to the regenerative braking torque generator from the frictional braking torque generator. Frictional braking torque is controlled to reach the target frictional braking torque transmitted to the frictional braking torque generator and regenerative braking torque is controlled to reach the target regenerative braking torque determined on the basis of the actual frictional braking torque transmitted to the regenerative braking torque generator. If the actual frictional braking torque is increased while maintaining the total braking torque constant, the regenerative torque is reduced by reducing the target regenerative braking torque.

The regenerative braking torque-reducing device can be provided in the regenerative braking torque generator or in the frictional braking torque generator or can be provided as a separate device or in another device. As mentioned above, during normal exchange of the data referring to the target regenerative braking torque and referring to the actual regenerative braking torque between the regenerative braking torque generator and the frictional braking torque generator, the regenerative braking torque can be reduced by reducing data referring to the target regenerative braking torque, which is transmitted from the frictional braking torque generator. In this case, the regenerative braking torque-reducing device can be contained in both the frictional braking torque generator and the regenerative braking torque generator or in only the frictional braking torque generator or can be contained in another device. On the other hand, if the exchanging data is abnormal, the target regenerative braking torque can be reduced. In this case, the regenerative braking torque-reducing device is contained in the regenerative braking torque generator or in another device.

Similarly, during normal exchange of the data referring to the target frictional braking torque and referring to the actual frictional braking torque between the regenerative braking torque generator and the frictional braking torque generator, if the data referring to the target frictional braking torque transmitted from the regenerative braking torque generator is increased, the target regenerative braking torque is reduced with the increase in the frictional braking torque, and the regenerative braking torque can be reduced. In this case, the regenerative braking torque-reducing device can be contained in both the frictional braking torque generator and the regenerative braking torque generator or in only the frictional braking torque generator or in another device. On the other hand, during abnormal exchange of the data referring to the target regenerative braking torque, if the actual frictional braking torque is increased in the frictional braking torque generator, the data referring to the actual frictional braking torque transmitted to the regenerative braking torque generator is increased and the regenerative braking torque is reduced. In this case, the regenerative braking torque-reducing device can be contained in the frictional braking torque generator or in another device. In this type of exchanging data, the regenerative braking torque can be reduced by increasing the frictional braking torque. Therefore, a frictional braking torque-increasing device is one kind of regenerative braking torque-reducing device.

As mentioned above, in the case when the total braking torque, which is a combination of the regenerative braking torque and the frictional braking torque, is controlled to become a target total braking torque, if one of the regenerative braking torque and the frictional braking torque is decided, the other one is decided based thereon. If the target regenerative braking torque and the target frictional braking torque are determined by the frictional braking torque generator, the total braking torque controlling device can be contained in the frictional braking torque generator. If the target frictional braking torque and the target regenerative braking torque are determined by the regenerative braking torque generator, the total braking torque controlling device can be contained in the regenerative braking torque generator.

The data referring to the target regenerative braking torque refers to the target regenerative braking torque or to base data used to determine the target regenerative braking torque, or to variable data indicating an increase/reduction of the target regenerative braking torque, e.g. operating data (brake operating power operated by the operator, pressure of the master cylinder, etc.). The operating data refers to the desired braking torque. In an initial braking period, there is a condition that the wheels' rotation is restrained by only the regenerative braking torque. In this case, the regenerative braking torque is determined to be the total target braking torque on the basis of the operating data.

The data referring to the actual regenerative braking torque refers to the actual regenerative braking torque or to base data used to calculate the actual regenerative braking torque or to variable data indicating an increase/reduction of the actual regenerative braking torque, e.g., a command value provided to control inverter controlling current supplied to the electric motor, revolution of the electric motor, etc.

Similarly, the data referring to the target frictional braking torque and the data referring to the actual frictional braking torque refer to the target frictional braking torque and to the actual frictional braking torque, base data used to calculate them, and/or variable data indicating an increase/reduction of them. For example, a voltage applied to a linear solenoid valve is the data referring to the target frictional braking torque, hydraulic pressure in a wheel cylinder or stress to a support member supporting a frictional pad is the data referring to the actual frictional braking torque.

This aspect of the braking torque control system for wheeled vehicles preferably includes an exchanging data fail-detecting device that detects whether the exchanging data between the regenerative braking torque generator and the frictional braking torque generator has failed. The exchanging data fail-detecting device comprises at least one of a data reception fail-detecting device that detects whether reception at the regenerative braking torque generator or the frictional braking torque generator has failed, a data transmission fail-detecting device that detects whether transmission from them has failed, and an exchanging data fail-detecting device that detects whether any means of exchanging data between them has failed.

The data reception fail-detecting device detects failure when expected data is not received, or if reliability of received data is low. If received data is outside of the optimum range or a difference between this received data and the last received data is larger than a prescribed value, the reliability of this received data is low. When no received data or low-reliable data is received only once or when no received data or low-reliable data is received some number of continuous times, the reception fail-detecting device detects that the reception has failed. The reliability of the received data can be judged on the basis of non-process data or smoothed data, e.g., a mean value.

The data transmission fail-detecting device detects failure when there is not expected data, if transmission of the data is impossible, or if reliability of transmitted data is low. The exchanging data fail-detecting device detects failure when the regenerative braking torque generator and the frictional braking generator disconnect with each other by means of exchanging data (i.e., there is no current).

As mentioned above, when the frictional braking torque generator transmits the data referring to the target regenerative braking torque to the regenerative braking torque generator and receives the data referring to the actual regenerative braking torque transmitted by the regenerative braking torque generator, if a difference between the data referring to the target regenerative braking torque and the data referring to the actual regenerative braking torque is larger than a prescribed value, the reliability is low. Similarly, if a difference between the data referring to the target frictional braking torque transmitted from the regenerative braking torque generator and the data referring to the actual frictional braking torque received at the regenerative braking torque generator is larger than a prescribed value, the reliability is low.

According to one embodiment of the invention, the regenerative braking torque generator contains a regenerative braking torque subordinate controller that controls the regenerative braking torque based on data from the frictional braking torque generator. Additionally, the frictional braking torque generator contains a frictional braking torque subordinate controller that controls the frictional braking torque based on data from the regenerative braking torque generator. Further, the regenerative braking torque-reducing device contains an exchanging data fail-detecting device that detects whether the means of exchanging data between the regenerative braking torque subordinate controller and the frictional braking torque subordinate controller has failed.

A category of the exchanging data between the regenerative braking torque generator and the frictional braking torque generator includes the exchanging data between the regenerative braking torque subordinate controller and the frictional braking torque subordinate controller. Alternatively, the regenerative braking torque generator can include a revolution detector that detects revolutions of an electric motor. The detected revolution, which is the data referring to the actual regenerative braking torque, is transmitted to the frictional braking torque subordinate controller in the frictional braking torque generator, rather than through the regenerative braking torque subordinate controller. The exchanging data in this case is in the category.

According to an embodiment of the invention, the regenerative braking torque generator includes an electric motor connected to the wheels, a battery that supplies power to the electric motor, an inverter installed between the battery and the electric motor and a motor controller that controls braking torque of the electric motor by controlling the inverter in order to provide regenerative braking torque to the wheels. The frictional braking torque generator includes a frictional brake that presses a brake pad against a brake rotor that rotates with the wheel, a pressure controller that controls the pressure of the brake pad pressing against the brake rotor in order to provide frictional braking torque to the wheel. The regenerative braking torque-reducing device can include an exchanging data fail-detecting device that detects whether exchanging data between the motor controller and the pressure controller has failed.

The regenerative braking torque-reducing device preferably gradually reduces the regenerative braking torque. Preferably, the frictional braking torque generator includes a frictional braking torque controller that controls the frictional braking torque so that the total braking torque reaches the target regenerative braking torque on the basis of brake operating power operated by an operator.

Thus, when exchanging data has failed, the regenerative braking torque is gradually reduced. Therefore, if the operator's operating power remains constant, that is, the target total braking torque remains constant, the frictional braking torque is gradually increased. The way of reducing the regenerative braking torque can be continuous or step-by-step.

Gradually reducing the regenerative braking torque can make controlling of the total braking torque more satisfactory compared to rapidly reducing the regenerative braking torque. In particular, when the maximum changing rate of the regenerative braking torque is larger than the maximum changing rate of the frictional braking torque, the frictional braking torque cannot be increased at a rate that is as quick as the maximum rate of the regenerative braking torque. Thus, if the regenerative braking torque is reduced at the maximum possible changing rate, the total torque cannot be kept constant. Therefore, the operator does not feel as if it is operating the conventional braking system. On the other hand, when the regenerative braking torque is gradually reduced so that the frictional braking torque can be increased at a similar rate, the controlling of the total braking torque can be satisfactory.

Preferably, the changing rate of the regenerative braking torque is made to be a smaller rate between the maximum possible changing rate of the frictional braking torque and the maximum possible changing rate of the regenerative braking torque.

According to an embodiment of the invention, the regenerative braking torque-reducing device gradually reduces the regenerative braking torque, and the frictional braking torque generator gradually increases the frictional braking torque at a changing rate that is the same as the changing rate of the regenerative braking torque.

Since the reducing rate of the regenerative braking torque is the same as the increasing rate of the frictional braking torque, the total braking torque is substantially constant. It can be smooth to switch from a state where both the regenerative braking torque and the frictional braking torque are given to a state where the regenerative braking torque is zero and only the frictional braking torque is given.

When the reducing rate is predetermined, and the exchange of data fails, the regenerative braking torque can be reduced at the constant rate, which is known, and the frictional braking torque generator can estimate the actual regenerative braking torque and control the frictional braking torque on the basis of that estimated torque. For example, when the regenerative braking torque generator and the frictional braking torque generator exchange data referring to the target regenerative braking torque and data referring to the actual regenerative braking torque, the regenerative braking torque generator can reduce the regenerative braking torque at a constant rate, even if the regenerative braking torque generator cannot receive the data referring to the target regenerative braking torque. Then, the frictional braking torque generator can estimate the actual regenerative braking torque, even if the frictional braking torque generator cannot receive data referring to the actual regenerative braking torque correctly.

The regenerative braking torque generator can include a regenerative braking torque target-controlling device that controls the regenerative braking torque to reach the target regenerative braking torque on the basis of the data referring to the target regenerative braking torque. A frictional braking torque subordinate-actual-controller controls the frictional braking torque based on data referring to the actual regenerative braking torque transmitted from the regenerative braking torque generator. The regenerative braking torque-reducing device reduces the regenerative braking torque at a constant rate when there is a failure to receive data referring to the target regenerative braking torque.

If the regenerative braking torque generator cannot receive data referring to the target regenerative braking torque correctly, the regenerative braking torque can be reduced at the constant rate. Thus, even if the data referring to the target regenerative braking torque cannot be received, the regenerative braking torque can be reduced at the constant rate.

The frictional braking torque generator controls the frictional braking torque based on the data referring to the actual regenerative braking torque transmitted from the regenerative braking torque generator. When this transmission is normal, the frictional braking torque can be controlled based on the actual regenerative braking torque and the total braking torque can be controlled satisfactorily during failure of exchanging data. If received data referring to the target regenerative braking torque at the regenerative braking torque generator has failed, the frictional braking torque generator can control the frictional braking torque based on data referring to the actual regenerative braking torque satisfactorily.

If the data referring to the actual regenerative braking torque cannot be received correctly, the frictional braking torque generator knows the reducing rate of the regenerative braking torque and can estimate the actual regenerative braking torque. The frictional braking torque can be controlled based on the estimated regenerative braking torque, and the controllability of the total braking torque is prevented from being diminished.

The regenerative braking torque generator can include a regenerative braking torque subordinate controller that controls the regenerative braking torque to reach the target regenerative braking torque based on data from the frictional braking torque generator. The frictional braking torque generator can include a frictional braking torque subordinate controller that controls the frictional braking torque based on the data referring to the actual regenerative braking torque transmitted from the regenerative braking torque generator. The regenerative braking torque-reducing device reduces data referring to the target regenerative braking torque transmitted to the regenerative braking torque generator when the frictional braking torque generator cannot receive the data referring to the actual regenerative braking torque correctly.

If the frictional braking torque generator cannot receive the data referring to the actual regenerative braking torque correctly, data referring to the target regenerative braking torque transmitted to the regenerative braking torque generator is reduced. The regenerative braking torque generator reduces the regenerative braking torque using the data referring to the target regenerative braking torque. The frictional braking torque generator estimates the actual regenerative braking torque to be the target regenerative braking torque and controls the frictional braking torque based on the target regenerative braking torque. In this case, the reducing rate varies, but gradual reduction is improved.

The frictional braking torque generator can include a hydraulic pressing device that presses the brake pad to the brake rotor by hydraulic pressure.

It is suitable for the pressing device that makes the brake pad press against the brake rotor to use hydraulic pressure or to drive using an electric motor or by deformation of material caused by applying voltage, e.g., a piezoelectric element. In these cases, the frictional braking torque generator is a hydraulic braking torque controller or an electric braking torque controller or a piezoelectric braking torque controller. The hydraulic braking torque controller is conventional for current wheeled vehicles.

According to another aspect of the invention, a controller functions as a braking torque fail-timing control device which reduces regenerative braking torque generated by the regenerative braking torque generator and increases frictional braking torque generated by the frictional braking torque generator when there is failure of the exchanging of data. The braking torque control system also includes a regenerative braking torque generator that provides regenerative braking torque to the wheels by regenerative brake action of an electric motor connected to the wheels. A frictional braking torque generator provides frictional braking torque to the wheels by pressing friction devices on brake elements that rotate with the wheels. The total braking torque, which is a combination of the regenerative braking torque and the frictional braking torque, is controlled to become a target total braking torque on the basis of exchanging data between the regenerative braking torque generator and the frictional braking torque generator.

The braking torque fail-timing control device reduces the regenerative braking torque and increases the frictional braking torque. Therefore, the total braking torque changes in a narrow range.

According to another aspect of the invention, a frictional braking torque-increasing device increases frictional braking torque generated by a frictional braking torque generator when there is failure of the exchanging of data. The braking torque control system can also include a regenerative braking torque generator that provides regenerative braking torque to the wheels by regenerative brake action of an electric motor connected to the wheels. A frictional braking torque generator provides frictional braking torque to the wheels by pressing friction devices on brake elements that rotate with the wheels. The total braking torque, which is a combination of the regenerative braking torque and the frictional braking torque, is controlled to become a target total braking torque on the basis of exchanging data between the regenerative braking torque generator and the frictional braking torque generator.

According to another aspect of the invention, a braking torque control system for a wheeled vehicle includes a regenerative braking torque generator that provides regenerative braking torque to the wheels by regenerative brake action of an electric motor connected to the wheels. A frictional braking torque generator provides frictional braking torque to the wheels by pressing friction devices on brake elements that rotate with the wheels. A total braking torque, which is a combination of the regenerative braking torque and the frictional braking torque, is controlled to become a target total braking torque on the basis of exchanging data between the regenerative braking torque generator and the frictional braking torque generator. A controller is selectively operative in (a) a priority-regenerative-braking torque controlling mode which controls the frictional braking torque based on the regenerative braking torque and (b) a priority-frictional-braking torque controlling mode which controls the regenerative braking torque based on increasing of the frictional braking torque. The controller switches from the priority-regenerating braking torque controlling mode to the priority-frictional-braking torque controlling mode when there is failure of exchanging of data.

BRIEF DESCRIPTION OF THE DRAWINGS

The above and/or other objects, features, advantages and technical and industrial significance of this invention will be better understood by reading the following detailed description of a presently preferred embodiment of the invention, when considered in connection with the accompanying drawing, in which.

DETAILED DESCRIPTION OF PREFERRED EMBODIMENTS

In the following, using the accompanying drawings, the present invention will be described in more detail in terms of an embodiment thereof.

Figure 1:
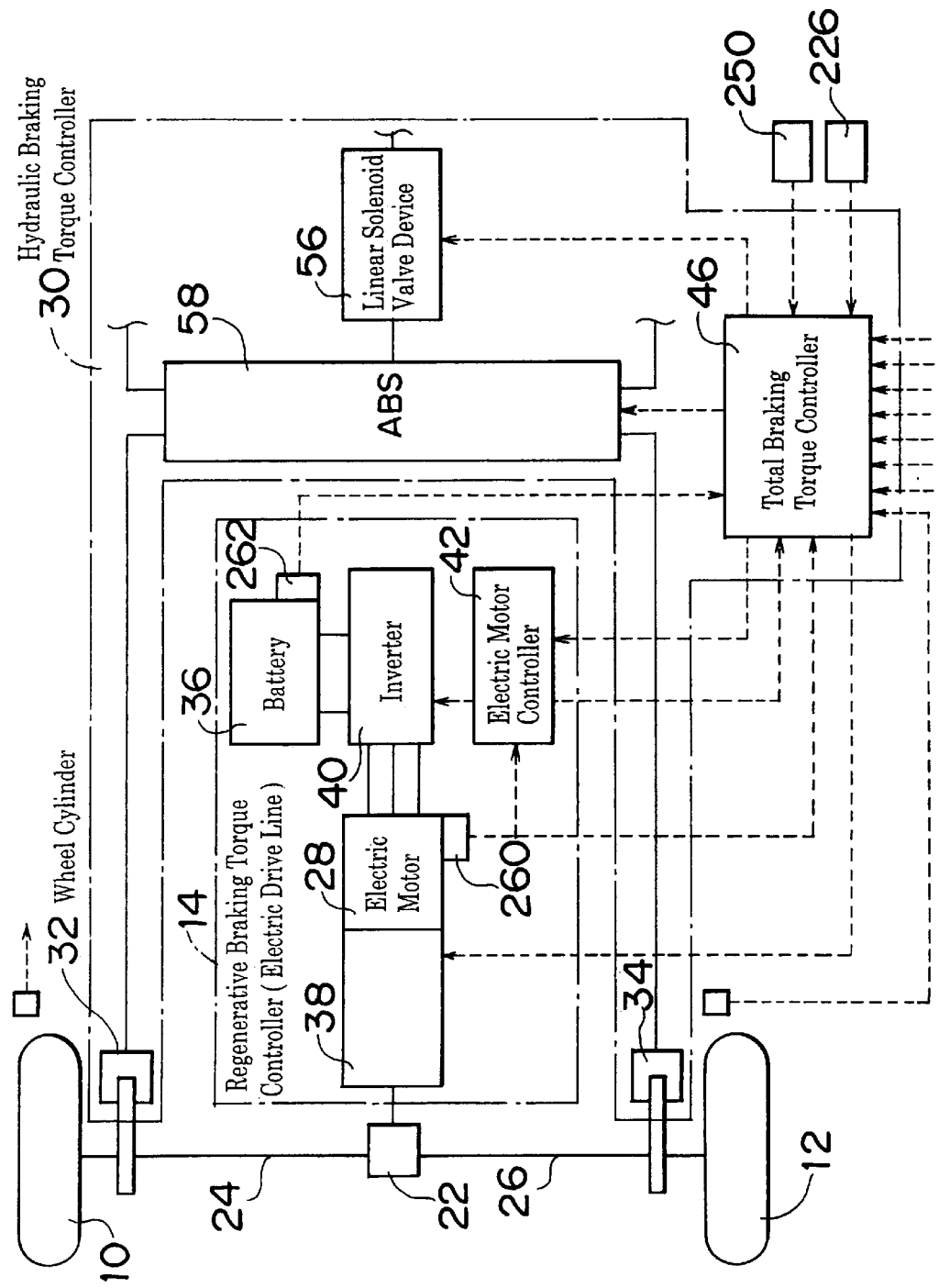
FIG. 1 is a block diagram showing a braking torque control system for a wheeled vehicle according to one embodiment of the present invention.

First referring to FIG. 1, a braking torque control system of this invention is applied to a hybrid electric vehicle. Front wheels 10, 12, which function as driving wheels, are driven by an electric drive line 14 and an internal combustion engine (not shown). The electric drive line 14 is connected to the wheels 10, 12 through differential gears 22 and drive shafts 24, 26. The electric drive line 14 gives the wheels 10, 12 regenerative braking torque by regenerative brake action of an electric motor 28, and thus function as a regenerative braking torque generator. The braking torque control system of this embodiment has a hydraulic braking torque controller 30, which functions as a frictional braking torque generator. The wheels 10, 12 are given hydraulic braking torque when brake pads, which function as friction devices, are pressed on brake rotors rotating with the wheels 10, 12 by providing hydraulic pressure for wheel cylinders 32, 34.

Thus, the wheels 10, 12 are given a total braking torque, which is comprised of the regenerative braking torque supplied by the regenerative braking torque controller 14 and the hydraulic braking torque supplied by the hydraulic braking torque controller. In this way, rotation of the wheels 10, 12 is controlled.

The regenerative braking torque controller 14 has a battery 36, a transmission 38, an inverter 40, an electric motor controller 42 and so on. When the shaft of the electric motor 28 is forcibly rotated by the wheels 10, 12, an electromotive force arises in the motor 28. If the battery 36 is charged by the electromotive force, the electric motor 28 acts as a load against the external force and consequently regenerative braking torque is generated. The inverter 40 inverts direct current from the battery 36 into alternating current. The alternating current is provided for the electric motor 28. The inverter 40 is controlled by the electric motor controller 42. The braking torque or the driving torque of the motor 28 is controlled by current control through the inverter and thus the regenerative braking torque or the driving torque on the wheels is controlled.

The regenerative braking torque can also be controlled by changing a gear ratio of the transmission 38. This is so because the rotating speed of the shaft of the electric motor 28 is changed by controlling the gear ratio of the wheels' rotation relative to rotation of the motor's shaft.

Figure 2:
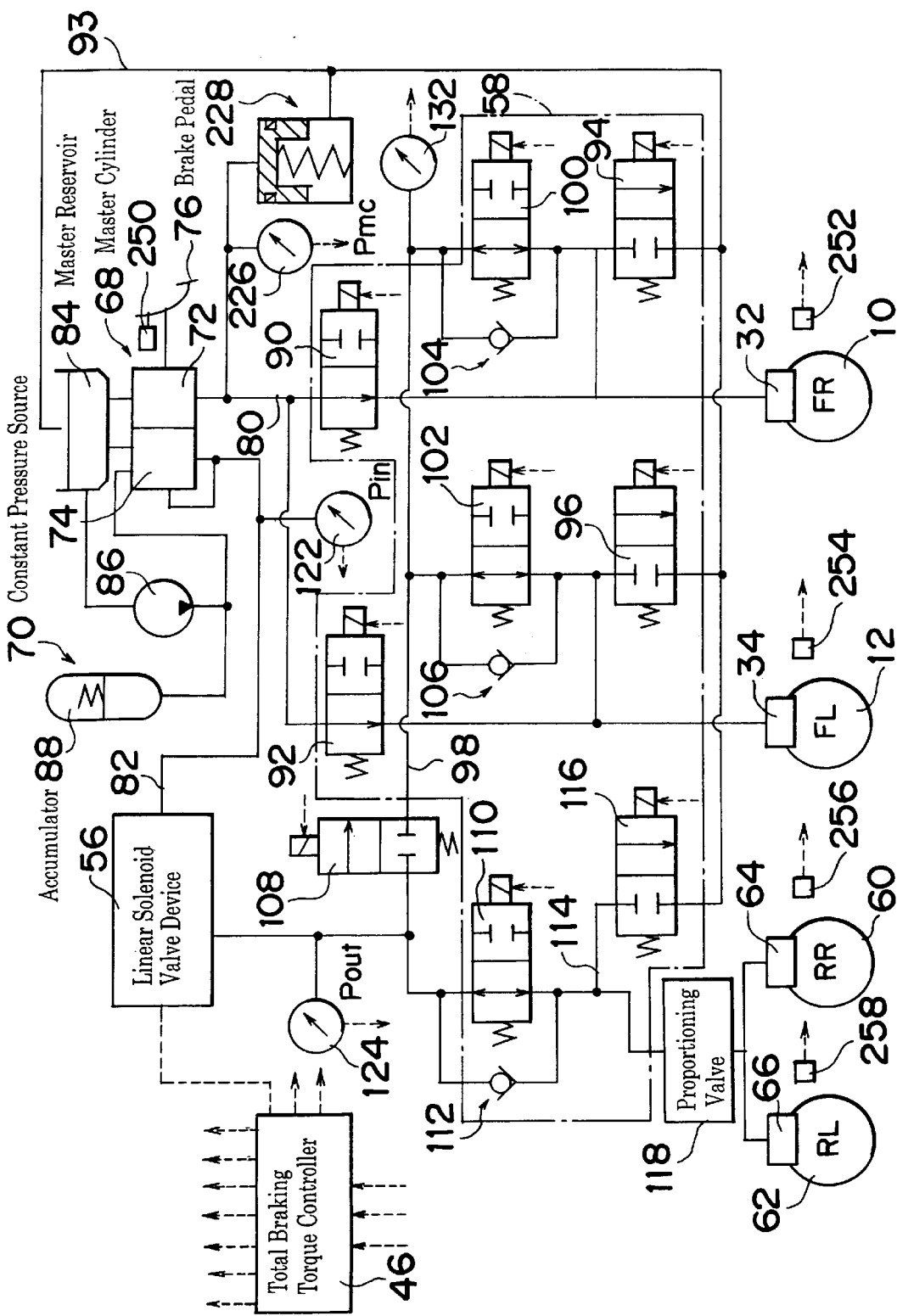
FIG. 2 is a diagram showing a hydraulic braking system in the braking torque control system of FIG. 1.

Referring to FIG. 2, the hydraulic braking torque controller 30 includes the wheel cylinders 32, 34 on the wheels 10, 12, wheel cylinders 64, 66 on rear wheels 60, 62, a total braking torque controller 46, a linear solenoid valve device 56, an anti-lock brake control device 58, a master cylinder 68, a constant pressure source 70 and so on. The total braking torque controller 46 controls hydraulic braking torque and total braking control, which is comprised of the regenerative braking torque and the hydraulic braking torque. The master cylinder 68 has two pressurized chambers 72, 74. Operating a brake pedal 76 causes the same hydraulic pressure to arise in each chamber 72, 74. One chamber 72 is connected to the wheel cylinders 32, 34 on the front wheels 10, 12 through fluid passage 80. The other chamber 74 is connected to the wheel cylinders 64, 66 on the rear wheels 60, 62 through fluid passage 82. The constant pressure source 70 includes the master reservoir 84, pump 86 and accumulator 88. Brake fluid in the master reservoir 84 is pumped up to the accumulator 88 by the pump 86 and the brake fluid is accumulated in the accumulator 88 under an established pressure range. A pressure sensor (not shown) is attached to the accumulator 88. There is hysteresis between a value of pressure causing the sensor to be ON and a value of pressure causing the sensor to be OFF. The pump 86 is started according to the ON-signal and stopped according to the OFF-signal. The constant pressure source 70 is connected to the chamber 74. Pressurized fluid is supplied to the chamber 74 by depression of the brake pedal 76. This reduces the amount of stroke of the pedal 76 that is required to obtain a desired braking action.

Open/close solenoid valves 90, 92 are installed in the fluid passage 80. When the valves 90, 92 are opened, the wheel cylinders 32, 34 and the master cylinder 68 communicate with each other. When the valves 90, 92 are closed, the wheel cylinders are disconnected from the master cylinder 68. In this case, a cooperative control mode, which is the mode in which the hydraulic braking torque controller 30 is operated in cooperation with the regenerative braking torque controller 14, and/or anti-lock control mode is executed.

Open/close solenoid valves 94, 96 are installed in a fluid passage 93, which connects the wheel cylinders 32, 34 to the master reservoir 84. When the valves 90, 92 are opened, the wheel cylinders 32, 34 and the master reservoir 84 communicate with each other. The hydraulic pressure in the wheel cylinders 32, 34 is reduced and then the hydraulic braking torque is reduced.

Open/close solenoid valves 100, 102 are in a fluid passage 98, which connects the wheel cylinders 32, 34 to the linear solenoid valve device 56. During the cooperative control mode in the case of normal braking, the valves 100, 102 are open and the wheel cylinders 32, 34 and the linear solenoid valve device 56 communicate with each other. Check valves 104, 106 are provided for bypass passages, which bypasses the open/close solenoid valves 100, 102. The check valves permit a flow of the fluid in a direction from the corresponding wheel cylinder 32, 34 toward the linear solenoid valve device 56, but inhibit a flow of the fluid in the opposite direction. The fluid in the wheel cylinders 32, 34 is returned through these check valves when depression of the brake pedal 76 is released.

An open/close solenoid valve 108 is installed between the fluid passage 98 and the open/close solenoid valves 100, 102. During the cooperative control mode and/or anti-lock control mode of the front wheels 10, 12, the valve 108 is held opened.

The linear solenoid valve device 56 is provided for the fluid passage 82 that connects the chamber 74 to the rear wheel cylinders 64, 66 of the rear wheels 60, 62. The fluid passage 98 is connected to the wheel cylinder side from the linear solenoid valve device 56 of the fluid passage 82. An open/close solenoid valve 110 is installed between the linear solenoid valve device 56 and the wheel cylinders 64, 66. A check valve 112, which permits a flow of the fluid in a direction from the corresponding wheel cylinders 64, 66 toward the linear solenoid valve device 56, but inhibits a flow of the fluid in the opposite direction, is provided for a bypass passage that bypasses the open/close solenoid valve 110.

An open/close solenoid valve 116 is installed in a fluid passage 114, which connects the wheel cylinders 64, 66 to the master cylinder 68. A proportioning valve 118 is also installed in the fluid passage 82 so that the pressure of the rear wheel cylinders 64, 66 does not exceed the pressure of the front wheel cylinders 32, 34. In this embodiment, the wheel cylinders 64, 66 are controlled in common.

A pressure sensor 122 is attached to the passage 82 between the linear solenoid valve device 56 and the master cylinder 68. Another pressure sensor 124 is attached to the wheel cylinder side of the passage 82 near the linear solenoid valve device 56. Another pressure sensor 132 is attached to the passage 98. The pressure sensor 132 is provided to check if the pressure sensor 124 has failed. It is determined that the output of the pressure sensor 124 is abnormal when the output of the pressure sensor 132 (when the open/close solenoid valve 108 is open) differs from the output of the pressure sensor 124.

Figure 3:
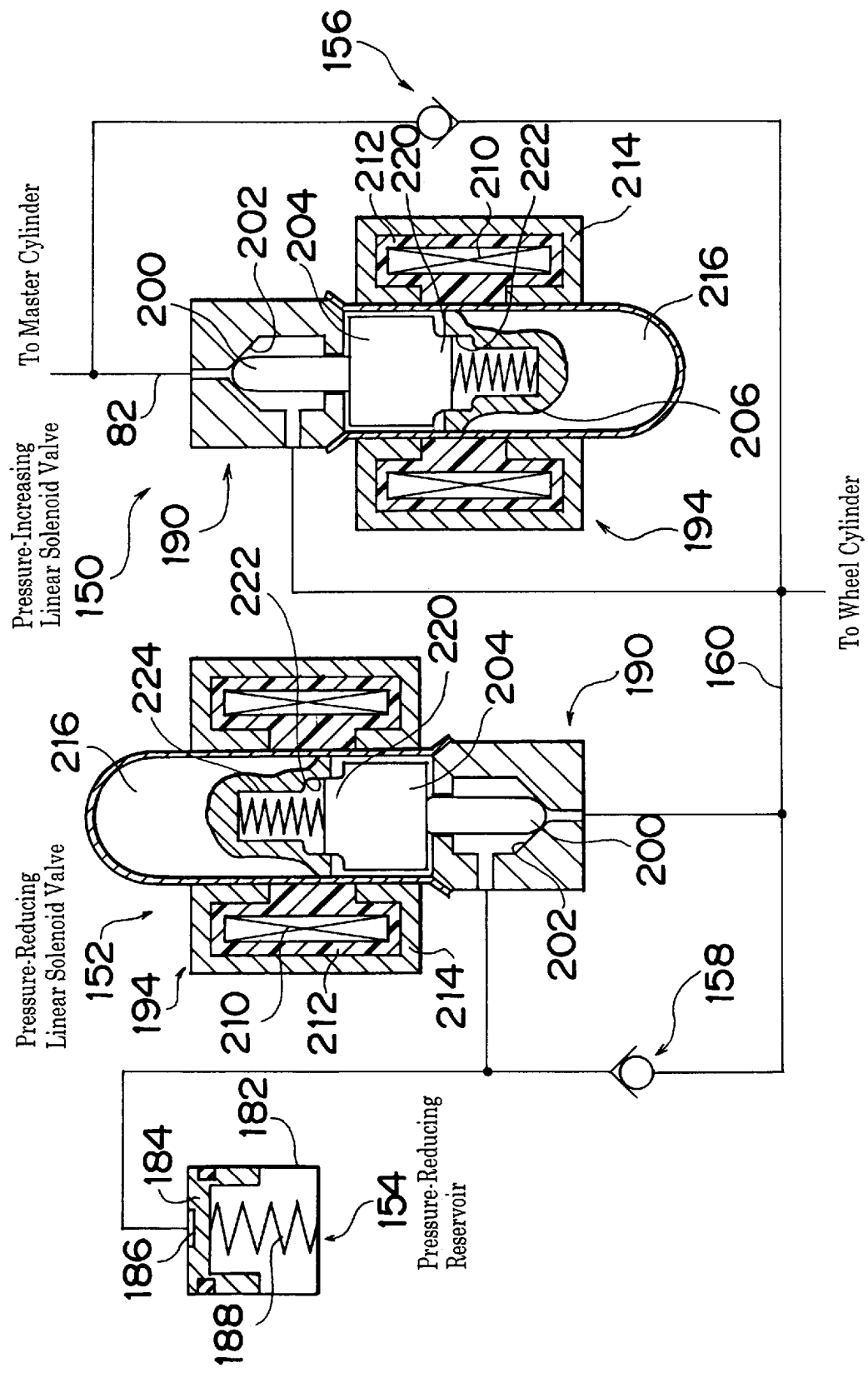
FIG. 3 is a view schematically showing an arrangement of a linear solenoid valve device in the braking system of FIG. 2.

Referring to FIG. 3, the linear solenoid valve device 56 includes a pressure-increasing linear solenoid valve 150, a pressure-reducing linear solenoid valve 152, a pressure-reducing reservoir 154 and check valves 156, 158. The pressure-increasing linear solenoid valve 150 is installed in the fluid passage 82, which is connected to the chamber 74. The pressure-reducing linear solenoid valve 152 is installed in a fluid passage 160, which connects the fluid passage 82 to the pressure-reducing reservoir 154. The check valve 156, which permits a flow of the fluid in a direction from the wheel cylinder side toward the master cylinder 68 and inhibits a flow of the fluid in the opposite direction, provides a bypass passage that bypasses the pressure-increasing linear solenoid valve 150. The check valve 158, which permits a flow of the fluid in a direction from the pressure-reducing reservoir 154 toward the master cylinder 68 and inhibits a flow of the fluid in the opposite direction, provides a bypass passage that bypasses the pressure-reducing linear solenoid valve 152.

The pressure-reducing reservoir 154 includes a housing 182 and a piston 184 fluid-tightly and slidably received in the housing 182. The housing 182 and the piston 184 cooperate to define a fluid chamber 186 whose volume changes as the piston 84 is moved. The piston 184 is biased by a compression coil spring 188 in a directio of reducing the volume of the fluid chamber 186.

The pressure-increasing linear solenoid valve 150 includes a seating valve 190 and an electromagnetic biasing device 194. The seating valve 190 includes a valve member 200, a valve seat 202, a biased member 204 movable with the valve member 200, and a spring 206, which functions as an elastic member for biasing the biased member 204 in a direction of moving the valve member 200 to be seated on the valve seat 202. The electromagnetic biasing device 194 includes a solenoid coil 210, a holder member 212 made of a resin material for holding the solenoid coil 210, a first magnetic path defining member 214 and a second magnetic path defining member 216. When an electric current flows through the solenoid coil 210 with a voltage being applied thereto at its opposite ends, a magnetic field is produced. By changing the voltage applied across the solenoid coil 210 (by changing the current supplied to the solenoid coil 210), the magnetic force acting between the biased member 204 and the second magnetic path defining member 216 changes accordingly.

The biased member 204 has a projection 220 extending from an end face thereof on the side of the second magnetic path defining member 216. The member 216 has a recess 222 such that the projection 220 is axially movable within the recess 222. The spring 206 is located in the recess 222.

When a voltage is applied to the solenoid coil 210, the magnetic path is defined by the solenoid coil 210, the first and second magnetic path defining members 214, 216 and the biased member 204. The magnetic resistance of the magnetic path defined by the biased member 204 and the second magnetic path defining member 216 varies with the axial relative position of these members 204, 216. In particular, a change in the relative axial position of the members 204, 216 will cause a change in the area of the projection 220 of the biased member 204 and the recess 222 of the member 216, which portions face each other in the radial direction via a small radial clearance between those circumferential surfaces. If the end faces of the two members 204, 216 were merely opposed to each other with a given axial clearance therebetween, the magnetic resistance of the magnetic path would decrease at an increasing rate and the magnetic force acting between the members 204, 216 would increase at an increasing rate, as the axial distance therebetween is reduced, that is, as the two members 204, 216 move toward each other. In the present pressure-increasing linear solenoid valve 150, however, the movement of the two members 204, 216 will cause an increase in the surface area of the mutually facing portions of the circumferential surfaces of the projection 220 and recess 222, with a result of an increase in the magnetic flux passing those mutually facing portions and a decrease in the magnetic flux passing the air gap between the end faces of the two members 204, 216. If the voltage applied to the solenoid coil 210 is held constant, therefore, the magnetic force that biases the biased member 204 toward the member 216 is kept substantially constant, irrespective of the relative axial position of the two members 204, 216. On the other hand, the biasing force of the spring 206, which biases the biased member 204 in the direction away from the member 216, increases as the two members 204, 216 are moved toward each other. Accordingly, when no biasing force acts on the valve member 200 based on the difference of pressures, the movement of the biased member 204 toward the member 216 is terminated when the biasing force of the spring 206 becomes equal to the magnetic force acting on the biased member 204.

The magnetic force that biases the biased member 204 toward the member 216 increases with an increase in the voltage applied across the solenoid coil 210. The relationship between the magnetic force and the voltage can be known. By continuously changing the voltage applied to the solenoid coil 210, the force biasing the biased member 204 can be changed accordingly.

When the magnetic force increases with an increase in the applied voltage, the pushing force of the valve member 200 against the valve seat 202 decreases and then the valve member 200 becomes easy to separate from the valve seat 202. If the biasing force acting on the valve member 200 based on the difference of pressures is larger than the force acting on the biased member 204, which is composed of the magnetic force and the biasing force based on the spring 206 and the direction of the both forces are opposite to each other, the valve member 200 separates from the valve seat 202. This opening pressure difference of the valve 150 decreases with an increase in the applied voltage.

Basically, the pressure-reducing linear solenoid valve 152 is identical in construction with the pressure-increasing linear solenoid valve 150. The opening pressure difference of the valve 152 decreases with an increase in the applied voltage. The spring 224 of the pressure-reducing linear solenoid valve 152 has a biasing force different from that of the spring 206 of the pressure-increasing linear solenoid valve 150. The same reference numerals as used for the pressure-increasing linear solenoid valve 150 are used to identify the functionally corresponding elements of the pressure-reducing linear solenoid valve 152, and redundant description of these elements will not be provided.

In the present embodiment, the opening pressure difference of the valve 150 is set to be about 3 Mpa (about 30.6 kgf/cm$^2$), while the opening pressure difference of the pressure-reducing linear solenoid valve 152 is set to be larger than 18 Mpa (about 184 kgf/cm$^2$), which is the maximum pressure of the fluid received from the constant pressure source 70. In this respect, it is noted that the biasing force of the spring 224 is higher than (about six times as high as) the biasing force of the spring 206. In the present hydraulic braking torque controller 30, the maximum pressure of the fluid to be applied to the pressure-reducing linear solenoid valve 152 is the maximum pressure of the fluid pressurized by the pump 86 and accumulated in the accumulator 88. There exists substantially no possibility that the fluid pressure pressurized by the master cylinder 68 upon depression of the brake pedal 76 by the vehicle operator exceeds the maximum pressure in the accumulator 88. Namely, the depression of the brake pedal 76 will not generally cause a flow of the fluid to the pressure-reducing reservoir 154 through the valve 152. Furthermore, the fluid accommodated in the pressure-reducing reservoir 154 is returned to the master reservoir 84 through the fluid passage 160, the check valve 158, the check valve 156, the fluid passage 82 and the master cylinder 68.

A pressure sensor 226 (refer to FIG. 2) is attached to the fluid passage 80. The pressure sensor 226 detects the pressure of the master cylinder 68. The pressure of the master cylinder 68 is proportional to depression of the brake pedal 76. Therefore, the braking torque corresponding to the pressure is regarded as braking torque desired by the operator and is set as the target total braking torque.

A stroke simulator 228 is connected to the fluid passage 80, for permitting the brake pedal 76 to be depressed even while the solenoid-operated shut-off valves 90, 92 are held closed, that is, for preventing the brake pedal 76 from being locked at its non-operated position with its operating amount being substantially zero.

A voltage applied to the solenoid coil 210 of either the pressure-increasing linear solenoid valve 150 or the pressure-reducing linear solenoid valve 152 in the linear solenoid valve device 56 (hereinafter 'control voltage to the linear solenoid valve device 56') is determined so that a pressure detected by the pressure sensor 124 reaches a pressure corresponding to a target hydraulic braking torque as mentioned later. When the voltage applied to the solenoid coil 210 of the pressure-increasing linear solenoid valve 150 is increased, the opening pressure difference of the valve 150 is reduced and the pressure detected by the pressure sensor 124 is increased. When the voltage applied to the solenoid coil 210 of the pressure-reducing linear solenoid valve 152 is increased, the opening pressure difference of the valve 152 is reduced and the pressure detected by the pressure sensor 124 is reduced.

During normal braking in the cooperative control mode, since the pressure detected by the pressure sensor 124 is estimated to be the same as the pressure in each wheel cylinder 32, 34, 64, 66, hydraulic braking torque corresponding to the pressure detected by the pressure sensor 124 is estimated as the actual hydraulic braking torque given to each wheel 10, 12, 60, 62. The control voltage supplied to the linear solenoid valve device 56 is determined so that this actual hydraulic braking torque reaches the target hydraulic braking torque (target value of hydraulic braking). In the present embodiment, the control voltage is determined so that a difference between the actual hydraulic braking torque, corresponding to the pressure detected by the pressure sensor 124, and the target hydraulic braking torque is reduced according to feedback control. This target hydraulic braking torque can be named linear control target hydraulic braking torque (linear control target value of hydraulic braking) in contrast with anti-lock control target hydraulic braking torque. In this specification, hereinafter, the linear control target hydraulic braking torque is called simply target hydraulic braking torque when it is not necessary to distinguish between the anti-lock control target hydraulic braking torque and the linear control target hydraulic braking torque.

While both the anti-lock control mode and the cooperative control mode are executed, pressure in each wheel cylinder 32, 34, 64, 66 is controlled independently (pressure in wheel cylinders 64, 66 is controlled in common). Therefore, the hydraulic braking torque corresponding to the pressure detected by the pressure sensor 124 does not equal the actual hydraulic braking torqu e given to each wheel. In this case, the voltage supplied to the linear solenoid valve device 56 is d determined so that the pressure detected by the pressure sensor 124 reaches a pressure corresponding to the linear control target hydraulic braking torque. The pressure in each wheel cylinder is controlled to reach a pressure corresponding to the anti-lock control target hydraulic braking torque so that a braking slip condition of each wheel is controlled to come to an appropriate condition.

In the braking torque control system for a wheeled vehicle of the present embodiment, hydraulic braking torque is given to the rear wheels 60, 62, which are driven wheels, and total braking torque including regenerative and hydraulic braking torque is given to the front wheels 10, 12, which are driving wheels. It is acceptable that at least one of the regenerative and hydraulic braking torque is zero. When the brake pedal 76 is depressed, target total braking torque is determined on the basis of the output signal from the pressure sensor 226 as mentioned above. The target total braking torque is determined in proportion to the intention of the vehicle's operator based on operating power, stroke or time to operate the brake pedal 76.

The total braking torque controller 46 and the electric motor controller 42 are mainly composed of a computer comprising ROM (Read Only Memory), RAM (Random Access Memory) and a PU (Processing Unit).

To an input port of the total braking torque controller 46, the pressure sensors 122, 124, 132, 226, a brake switch 250, which detects whether the brake pedal 76 is depressed, front wheel velocity sensors 252, 254, which detect velocity of the front wheels 10, 12, respectively, rear wheel velocity sensors 256, 258, which detect velocity of the rear wheels 60, 62, respectively, an encoder 260, which detects revolving speed of the electric motor 28, and a state of charge detecting device 262, which detects the state of charge of the battery 36, are connected.

To an output port of the total braking torque controller 46, the electric motor controller 42 is connected, and through driver circuits (not shown), the solenoid coils of the open/close solenoid valves 90, 92, 94, 96, 100, 102, 108, 110, 116, and through another driver circuit (not shown), the transmission 38 is connected.

Various programs are stored in the ROM. For example, a total braking torque switching program illustrated as a flow chart in FIG. 4, a total braking torque normal-control program illustrated as a flow chart in FIG. 5, a total braking torque before-stop-control program illustrated as a flow chart in FIG. 6, a total braking torque exchange-data-fail-timing control program illustrated as a flow chart in FIG. 9 and so on are stored in the ROM. A map for determining a maximum value of power generation also is stored in the ROM.

To an input port of the electric motor controller 42 are connected the encoder 260 and an accelerator operating state detecting device (not shown), which detects the operating state of the accelerator (not shown). To an output port of the electric motor controller 42 are connected the total braking torque controller 46 and the inverter 40. Various programs are stored in the ROM, e.g. a driving torque control program (not illustrated as a flow chart) and a regenerative braking torque control program illustrated as a flow chart in FIG. 10. The inverter 40 is controlled so that driving torque corresponding to the operating state of the accelerator is given to the wheels and so that regenerative braking torque corresponding to the target regenerative braking torque (target value of regenerative braking) is given to the wheels.

Data are exchanged between the electric motor controller 42 and the total braking torque controller 46. Data referring to the target regenerative braking torque are transmitted from the total braking torque controller 46 to the electric motor controller 42, and data referring to the actual regenerative braking torque are transmitted from the electric motor controller 42 to the total braking torque controller 46. In the electric motor controller 42, actual regenerative braking torque is calculated based on the revolution of the electric motor, and data referring to the actual regenerative braking torque is transmitted to the total braking torque controller 46. The revolution of the electric motor 28 also is transmitted to the total braking torque controller 46. The maximum value of power generation is obtained by using the map in FIG. 7, and is based on the revolution of the motor, and then the target regenerative braking torque is determined.

Figure 7:
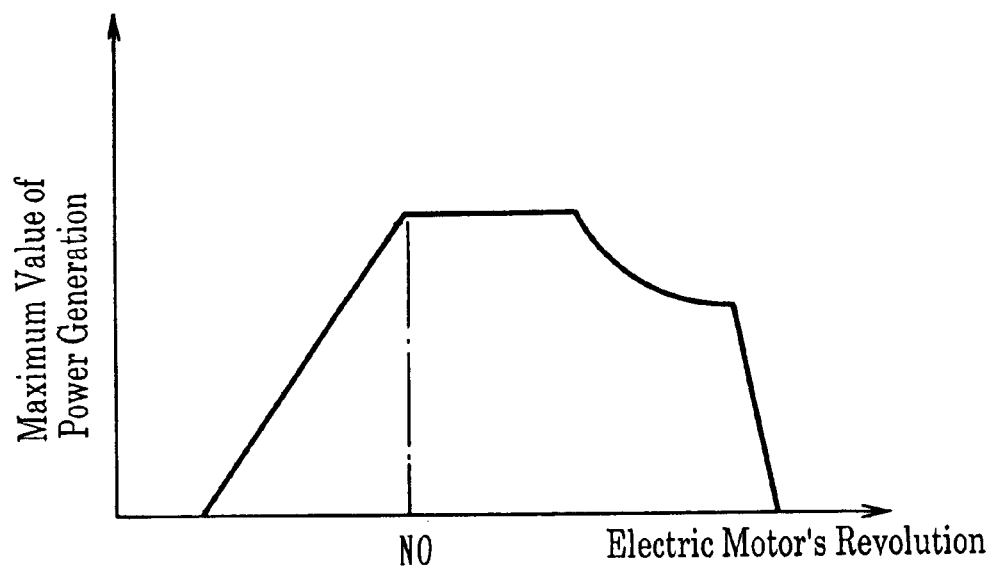
FIG. 7 is a graph indicating a relationship between revolutions of an electric motor and a maximum value of power generation in the braking torque control system of FIG. 1.

While the above-mentioned exchanging data is normal and the vehicle's velocity is greater than a prescribed velocity, normal-control (normal control in normal exchanging data) is executed. While the above-mentioned exchanging data is normal and vehicle's velocity is less than the prescribed velocity, before-stop-control (before-stop-control in normal exchanging data) is executed. If the exchanging data is abnormal, exchange-data-fail-timing control is executed. The prescribed velocity corresponds to revolution amount NO of the electric motor 28, as shown in FIG. 7.

During the normal-control, hydraulic braking torque is controlled so as to be dependent on regenerative braking torque. The target regenerative braking torque is determined as the minimal value among a maximum generating value, a maximum charging value and a maximum operating value. The maximum generating value is a maximum value of regenerative braking torque that is possible based on the current generating conditions, e.g. revolution speed of the electric motor 28. The maximum charging value is a maximum value of regenerative braking torque that is possible based on the state of charge of the battery. For example, as is known, in order to avoid damaging the battery, it is not desirable to further charge a fully charged battery, and thus it is not possible to generate much regenerative braking torque in such a state. The maximum operating value is a maximum value of regenerative braking torque determined based on the operating power provided by the driver to the brake pedal 76. The maximum operating value corresponds to the total target braking torque. Thus, the minimal value is determined so that regenerating can be obtained most efficiently without exceeding the total target braking torque. The target hydraulic braking torque is determined by subtracting the actual regenerative braking torque from the total target braking torque. The actual regenerative braking torque is controlled so that the generator can perform the most efficient generating. Hereinafter, the minimal value is named the most efficiently generating value.

Data referring to the target regenerative braking torque determined as mentioned above are transmitted from the total braking torque controller 46 to the electric motor controller 42. The electric motor controller 42 determines a controlling value that it provides to the inverter 40 so that regenerative braking torque reaches the transmitted target regenerative braking torque. Electric motor controller 42 then transmits the actual regenerative braking torque to the total braking torque controller 46. The total braking torque controller 46 determines the target hydraulic braking torque (target value of hydraulic braking) by subtracting the actual regenerative braking torque from the target total braking torque, and determines the control voltage to be provided to the linear solenoid valve device 56 so that braking torque corresponding to the pressure detected by the pressure sensor 124 approaches the target total braking torque.

Since the normal-control can control the regenerative braking torque to reach the most efficient generating value, the kinetic energy (of the vehicle) is prevented from being wasted.

As shown in FIG. 7, the maximum value of power generation is substantially constant for revolution levels of the electric motor 28 that are greater than revolution amount N0. Consequently, the most efficient generating value is constant and the regenerative braking torque is controlled to be constant. Furthermore, because the brake-operating power of the vehicle's operator usually is constant in one braking operation, the target total braking torque and the target hydraulic braking torque are determined as constants and the deviation of the hydraulic braking torque is small. Therefore, the total braking torque can be constant and the operator can feel as though it is operating a conventional braking system.

When the vehicle's velocity is less than the prescribed velocity and the revolution of the electric motor 28 is less than the revolution amount N0, the maximum value of power generation drops rapidly and regenerative braking torque drops rapidly. The rate of reducing the regenerative braking torque can easily exceed a prescribed reducing rate. (As detailed later, the prescribed reducing rate is the maximum possible changing rate of the hydraulic braking torque.) In this situation, if hydraulic braking torque is controlled based on the regenerative braking torque, error of the hydraulic braking torque (the difference between the target hydraulic braking torque and the actual hydraulic braking torque) becomes large and fluctuates greatly. Therefore, the error of the total braking torque becomes large and fluctuates greatly, and total braking torque cannot be accurately controlled to the target total braking torque.

In this embodiment, the target hydraulic braking torque is increased at a predetermined rate, and regenerative braking is based on the hydraulic braking (instead of vice-versa) so as to avoid the above situation. Increasing hydraulic braking torque at the predetermined rate is relatively easy.

Thus, when the vehicle's velocity is less than the prescribed velocity, the regenerative braking torque is controlled based on the hydraulic braking torque. The target hydraulic braking torque is increased at a constant rate and the target regenerative braking torque is determined by subtracting the actual hydraulic braking torque from the target total braking torque. Thus, if the target total braking torque remains constant, the target regenerative braking torque is reduced gradually.

During controlling of hydraulic braking torque, it is difficult to accurately control the actual hydraulic braking torque to the target hydraulic braking torque, because viscosity of the fluid changes greatly because of changes of temperature of the fluid and frictional coefficient between the brake pad and the brake rotor changes greatly and delay of actual hydraulic braking torque to the target hydraulic braking torque is large. Consequently, if the target hydraulic braking torque is changed by a large amount, an error becomes large and fluctuates greatly.

However, if the target hydraulic braking torque is increased at a gradual, constant rate, fluctuation of the error of the hydraulic braking torque can be small during increasing of hydraulic braking torque. On the other hand, since influence of the change of temperature of the fluid is small in one braking operation, the actual hydraulic braking torque can increase at the same rate as the increasing rate of the target hydraulic braking torque. Therefore, the error of the hydraulic braking torque is small and changes by a small amount, and regenerative braking torque can absorb the deviation of the hydraulic braking torque when range of controlling regenerative braking torque is small.

If the constant rate is too large, the error of the hydraulic braking torque is large and has greater fluctuation, but moving from the cooperative control mode to the hydraulic brake mode is rapid. Consequently, the constant rate should be determined as the maximum possible rate in which the error of the hydraulic braking torque or the change of the error can be absorbed by controlling the regenerative braking torque. As shown FIG. 7, while the revolution amount of the electric motor is smaller than the revolution amount N0, regenerative braking torque becomes small and cannot absorb large error of the hydraulic braking torque and large change of the error, but it can absorb the small error and the small change of the error. The constant rate is determined so that the small error and the small change of the error are permitted to occur.

While the vehicle's velocity is smaller than the prescribed velocity, the maximum value of power generation becomes small and the most efficient generating value becomes small. Therefore, the kinetic energy is not wasted. Controlling regenerative braking torque can absorb deviation of the hydraulic braking torque and the total braking torque can be controlled accurately.

During the anti-lock control mode, target regenerative braking torque is determined as a minimal value among a maximum wheel-state value, the maximum generating value, the maximum charging value and the maximum operating value. The maximum wheel state value is determined based on the rotating state of the wheels, e.g., a braking slip condition of each wheel 10, 12. Linear control target hydraulic braking torque is determined by subtracting actual regenerative braking torque from the target total braking torque and anti-lock control target hydraulic braking torque is determined so that the braking slip condition of each wheel 10, 12 is maintained in a suitable state.

In contrast, if data exchanging between the total braking torque controller 46 and the electric motor controller 42 is abnormal, it is difficult to perform total braking control in which regenerative braking torque and hydraulic braking torque are controlled to come to the target total braking torque. In this embodiment, the regenerative braking torque is reduced to zero and only the hydraulic braking torque is used to brake the vehicle when there is a data exchange failure or other abnormality.

It is detected that exchanging data is abnormal, that is, receiving data has failed, if one of the following conditions has occurred: (1) expected data is not received, (2) received data is outside of an optimum range, and (3) a difference between the received data and the last received data is larger than a prescribed value. Each of these conditions is considered to be a condition in which abnormal data is received. It is detected that receiving data has failed if a difference between regenerative braking torque corresponding to transmitting data to the electric motor controller 42 and actual regenerative braking torque corresponding to data transmitted by the electric motor controller 42 is larger than a prescribed value.

These failure conditions are caused by trouble of a data transmitting device, by trouble of a data receiving device, and/or by trouble of an exchanging data device.

The following conditions are failure conditions of exchanging data: (a) the total braking torque controller 46 abnormally receives data referring to actual regenerative braking torque transmitted from the electric motor controller 42, (b) the electric motor controller 42 abnormally receives data referring to target regenerative braking torque transmitted from the total braking torque controller 46, and (c) receiving data at both controllers 42, 46 are abnormal. Thus, there can be failure in data exchange from controller 42 to controller 46, or from controller 46 to controller 42, or in both directions.

First will be explained the condition (a) in which the total braking torque controller 46 abnormally receives data referring to actual regenerative braking torque transmitted from the electric motor controller 42. When this condition occurs, the total braking torque controller 46 reduces the target regenerative braking torque to zero. This control is performed based on the supposition that the total braking torque controller 46 can still normally transmit data referring to the target regenerative braking torque to the electric motor controller 42, the electric motor controller 42 can still normally receive the data and the electric motor controller can still control regenerative braking torque to approach the target regenerative braking torque. The total braking torque controller 46 cannot, however, normally receive the actual regenerative braking torque, but the total braking torque controller 46 can, instead, estimate the actual regenerative braking torque to be the same as the target regenerative braking torque. Therefore, for condition (a) the total braking torque controller 46 gradually reduces the target regenerative braking torque transmitted to the electric motor controller 42, determines the target hydraulic braking torque by subtracting the target regenerative braking torque from the target total braking torque, and determines the control voltage to be provided to the linear solenoid valve device 56 on the basis of the target hydraulic braking torque. Thus, the target hydraulic braking torque is increased gradually as the target regenerative braking torque is gradually reduced.

In this embodiment, rather than quickly reducing the regenerative braking torque to zero at the maximum possible rate for the regenerative braking system, the regenerative braking torque is reduced to zero at a slower rate that is no higher than (and preferably is lower than) the maximum changing rate for the hydraulic braking system. (As noted earlier, the maximum rate at which the hydraulic braking torque can be increased is lower than the maximum rate at which the regenerative braking torque can be decreased.) Accordingly, even when there is a data exchange failure, the total braking torque can be maintained substantially constant.

Next, will be explained the condition (b) in which the electric motor controller 42 abnormally receives data referring to target regenerative braking torque transmitted from the total braking torque controller 46. In this condition, the electric motor controller 42 automatically controls the inverter 40 to (gradually) reduce the regenerative braking torque (preferably to zero) and transmits data referring to actual regenerative braking torque to the total braking torque controller 46. The total braking torque controller 46 determines the target hydraulic braking torque in the usual manner.

In the condition (c) in which receiving data at both controllers 42, 46 is abnormal, the total braking torque controller 46 executes the total braking torque exchanging data-fail-timing control as above-mentioned in the condition (a) and the electric motor controller 42 executes the electric-motor exchanging data-fail-timing control as above-mentioned in the condition (b).

The following explains actions of the braking torque control system of this embodiment based on flow charts.

Figure 4:
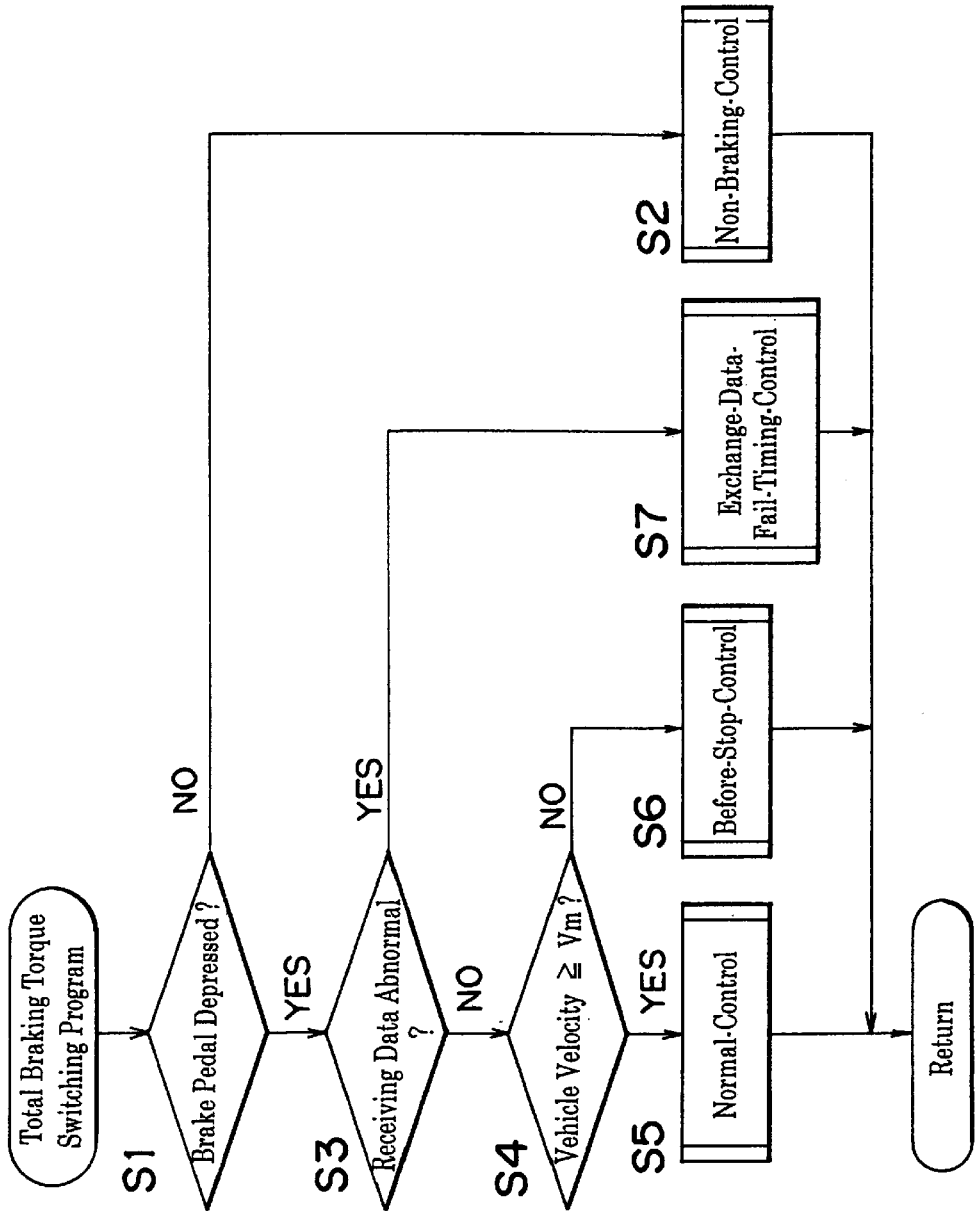
FIG. 4 is a flow chart illustrating a total braking torque switching program stored in a ROM of a total braking torque controlling device of the braking torque control system of FIG. 1.

The total braking torque switching program as illustrated in the flow chart of FIG. 4 is executed by the total braking torque controller 46.

Step S1 decides whether the brake pedal 76 is depressed on the basis of an output signal from the brake switch 250. If the brake pedal 76 is not depressed, step S2 executes non-braking-control. The control voltage to the linear solenoid valve device 56 is kept to zero and the condition of each open/close solenoid valve is maintained as shown in FIG. 2. Target regenerative braking torque is determined to be zero.

If the brake switch 250 is ON, step S3 decides whether receiving data referring to actual regenerative braking torque transmitted from the electric motor controller 42 is normal. If the receiving data is normal, step S4 decides whether the vehicle's velocity is greater than or equal to the prescribed velocity Vm. If the vehicle's velocity is at least the prescribed velocity, the decision of step S4 is YES and step S5 selects the total braking torque normal-control program. If the vehicle's velocity is less than the prescribed velocity, the decision of step S4 is NO and step S6 selects the total braking torque before-stop-control program. When the vehicle's velocity becomes less than the prescribed velocity from a velocity over the prescribed velocity, the executed program is switched over from the total braking torque normal-control program to the total braking torque before-stop-control program. If the receiving data referring to the actual regenerative braking torque is not normal, the decision of step S3 is YES and step S7 selects the total braking torque exchange-data-fail-timing control program.

Figure 10:
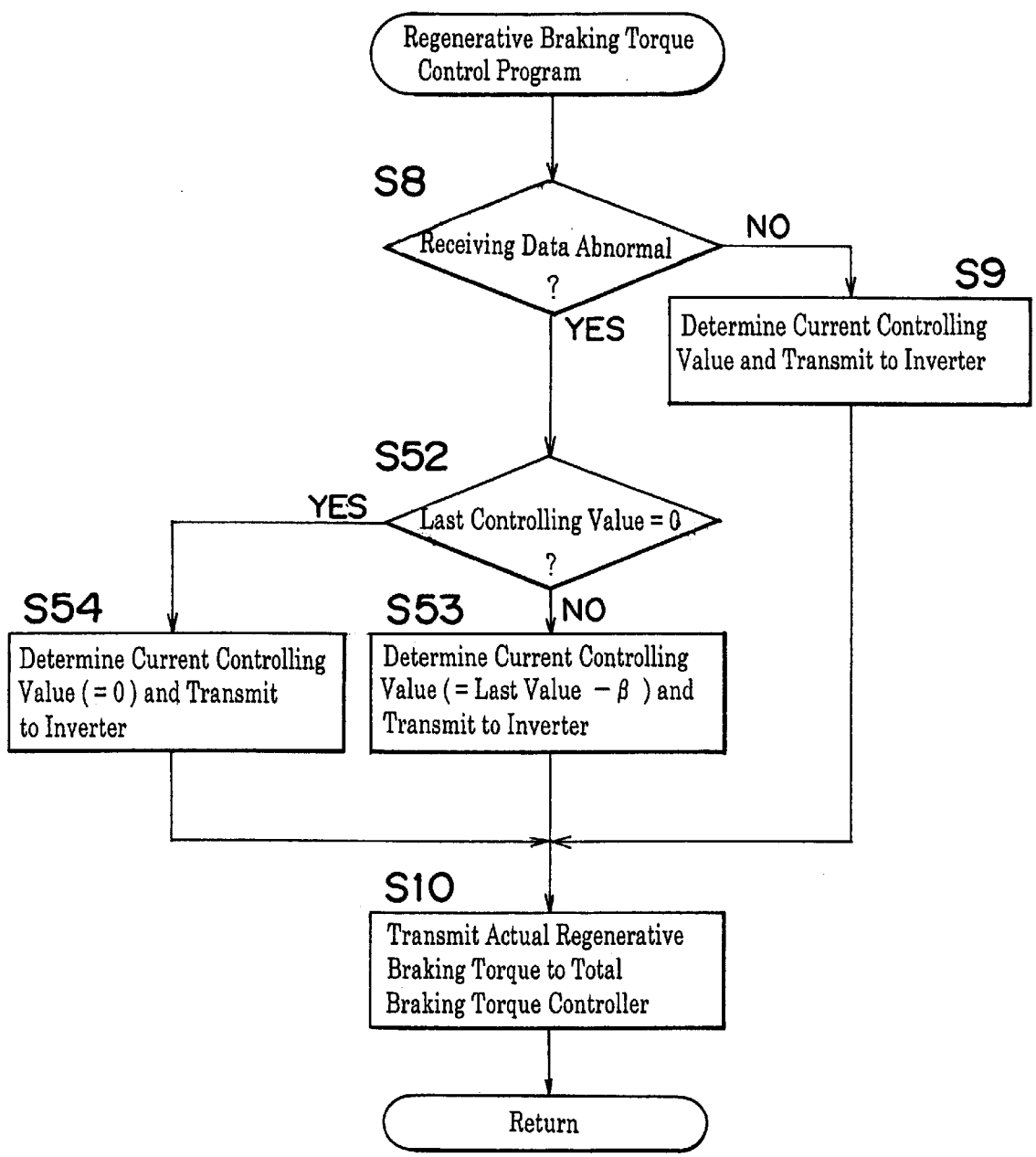
FIG. 10 is a flow chart illustrating a regenerative braking torque control program stored in a ROM of an electric motor controlling device of the braking torque control system of FIG. 1.

The regenerative braking torque control program as illustrated in the flow chart of FIG. 10 is executed in the electric motor controller 42. Step S8 decides whether receiving data referring to target regenerative braking torque transmitted from the total braking torque controller 46 is normal. If the receiving data is normal, decision of step S8 is NO and steps S9, S10 execute regenerative braking torque normal-control. A current controlling value to be supplied to the inverter 40 is determined so that regenerative braking torque approaches the received target regenerative braking torque. The inverter 40 is controlled based on the controlling value and the electric motor 28 is controlled. Actual regenerative braking torque is calculated on the basis of revolution of the electric motor 28 and data referring to the actual regenerative braking torque is transmitted to the total braking torque controller 46. If the receiving data is not normal, the decision of step S8 is YES and step S52 and subsequent steps execute regenerative braking torque exchange-data-fail-timing control as mentioned later.

Figure 5:
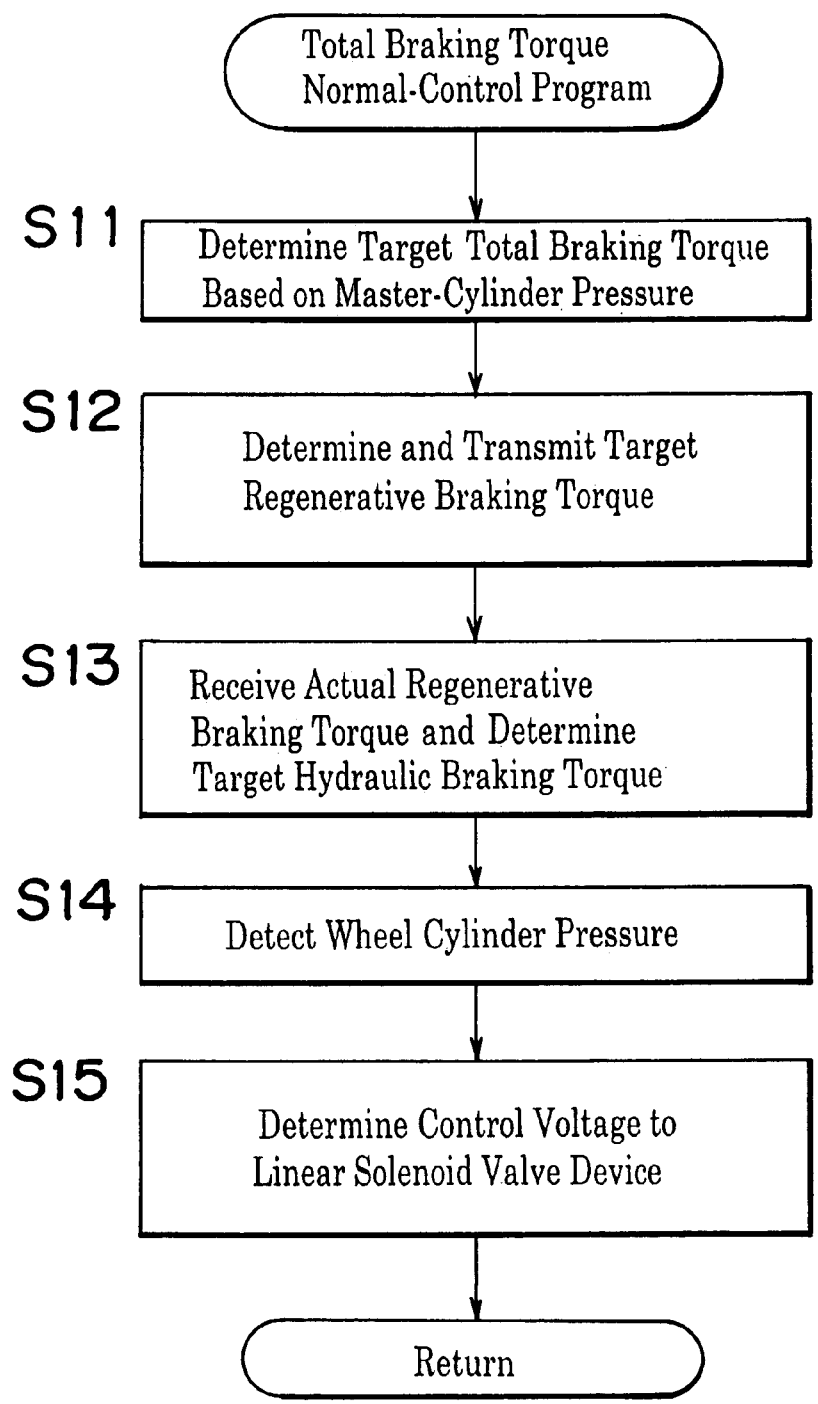
FIG. 5 is a flow chart illustrating a total braking torque normal-control program stored in the ROM of the total braking torque controlling device of the braking torque control system of FIG. 1.

In the execution of the total braking torque switching program as illustrated in the flow chart of FIG. 4, if the receiving data is normal and the vehicle's velocity is over the prescribed velocity, total braking torque is controlled based on execution of the total braking torque normal-control program as illustrated in the flow chart of FIG. 5 in the total braking torque controller 46.

Step S11 determines the target total braking torque on the basis of pressure of the master cylinder 68 detected by the pressure sensor 226. Step S12 determines the target regenerative braking torque as the most efficient generating value, and data referring to the target regenerative braking torque is transmitted to the electric motor 42. Step S13 determines the target hydraulic braking torque by subtracting the received data referring to the actual regenerative braking torque (transmitted from the electric motor controller 42) from the target regenerative braking torque calculated in step S11. Steps S14, S15 determine the control voltage to be provided to the linear solenoid valve device 56 so that the difference between the target hydraulic braking torque and the hydraulic braking torque (corresponding to the pressure of the wheel cylinder detected by the pressure sensor 124) is made to be zero.

If the vehicle's velocity becomes less than the prescribed velocity, the total braking torque before-stop-control program is executed.

Figure 6:
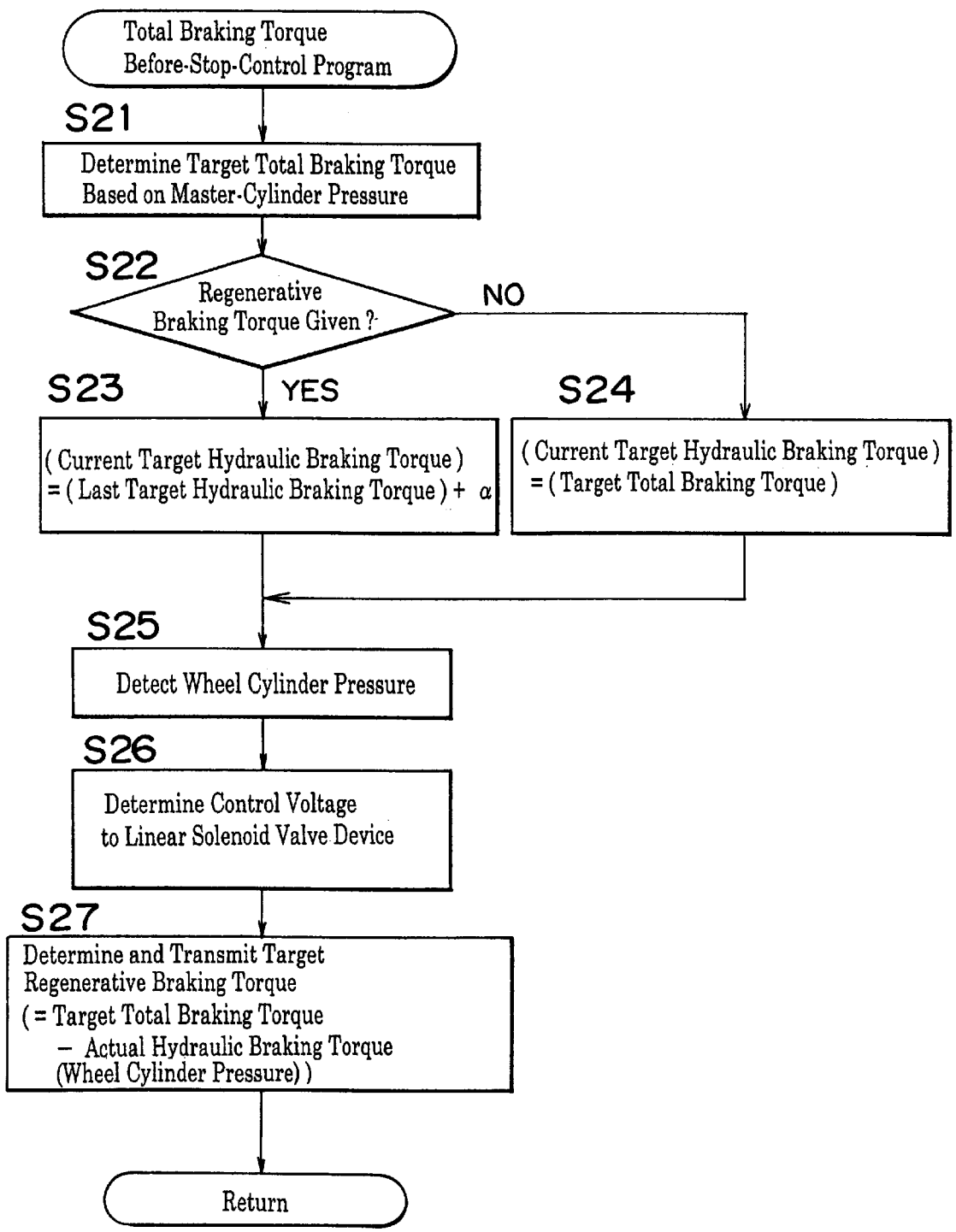
FIG. 6 is a flow chart illustrating a total braking torque before-stop-control program stored in the ROM of the total braking torque controlling device of the braking torque control system of FIG. 1.

Step S21 in the flow chart of FIG. 6 determines the target hydraulic braking torque on the basis of pressure of the master cylinder in the same way as in step S11. Step S22 detects whether the actual regenerative braking torque corresponding to the received data transmitted from the electric motor controller 42 is larger than zero, that is, whether regenerative braking torque is given. If actual regenerative braking torque is larger than zero (YES of step S22), the current target hydraulic braking torque is determined by adding a fixed value alpha to the last target hydraulic braking torque. If actual regenerative braking torque is zero (NO of step S22), the current target hydraulic braking torque is determined to be the target total braking torque. As mentioned above, because the hydraulic braking torque is increased when the braking condition is moved from a condition in which the wheels are given both regenerative braking torque and hydraulic braking torque to the condition in which the wheels are given only hydraulic braking torque, the state eventually occurs in which regenerative braking torque is not given to the wheels. The following are the cases when regenerative braking torque is not given to the wheels when step S22 is executed: the vehicle is not moving; hydraulic braking torque is already increased to be the same as the target total braking torque. If the actual regenerative braking torque is zero and the vehicle is stopped, step S24 maintains the hydraulic braking torque to the target total braking torque while the brake pedal is depressed.

Step S25 detects the pressure of the wheel cylinders using the pressure sensor 124. Step S26 determines the control voltage to be provided to the linear solenoid valve device 56 so that the difference between the target hydraulic braking torque and hydraulic braking torque corresponding to the pressure of the wheel cylinders is small. Step S27 determines the actual hydraulic braking torque to be the hydraulic braking torque corresponding to the pressure of the wheel cylinders, and then determines the target regenerative braking torque by subtracting the actual hydraulic braking torque from the target total braking torque. Data referring to the target regenerative braking torque is transmitted to the electric motor controller 42. Thus, the target regenerative braking torque is reduced as the actual hydraulic braking torque is increased.

The fixed value alpha added to the last target hydraulic braking torque in determining the target in step S23 is determined so that the target hydraulic braking torque is increased at a constant, gradual rate.

Figure 8A:
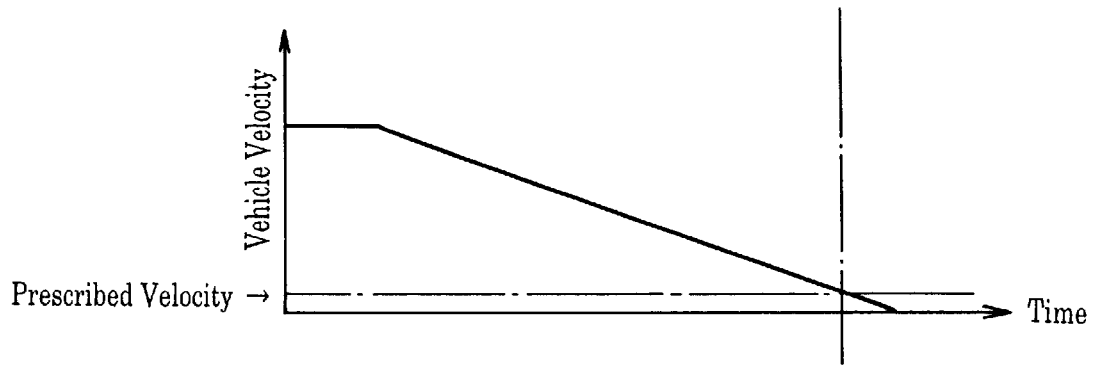
FIGS. 8A–8C are a graph indicating one example of control in the braking torque control system of FIG. 1.
Figure 8B:
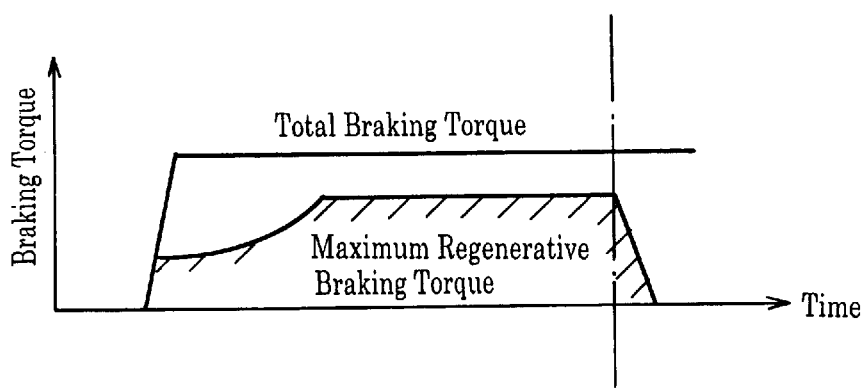
Figure 8C:
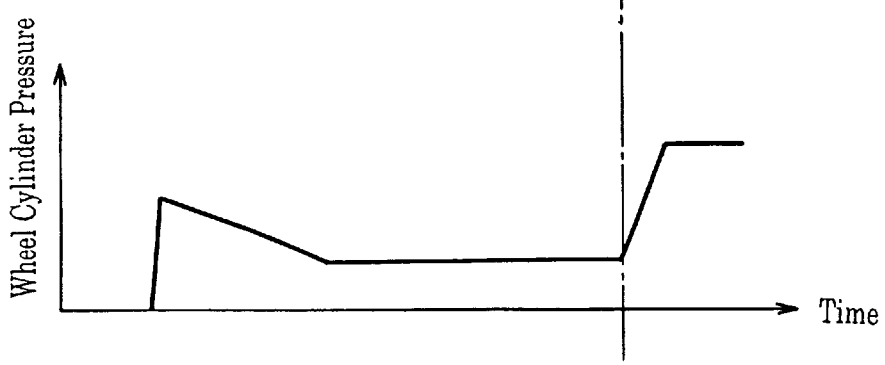

The result of controlling as mentioned above is indicated in FIGS. 8A–8C. The vehicle's velocity is reduced by braking. If the vehicle's velocity is greater than the prescribed velocity, regenerative braking torque is controlled to the most efficient generating value and hydraulic braking torque is controlled based on the regenerative braking torque. Because change of the regenerative braking torque is small and change of the hydraulic braking torque is small, total braking torque is kept constant and the operator feels as if it is operating a conventional brake. Regenerative braking torque is controlled to the most efficient generating value, therefore, efficiency of regenerating energy is prevented from being reduced.

While the vehicle's velocity is less than the prescribed velocity, hydraulic braking torque is increased at the constant rate and regenerative braking torque is reduced based on the hydraulic braking torque. The error of the hydraulic braking torque fluctuates by a small amount because the hydraulic braking torque is increased at the constant, gradual rate. If changing of the error occurs, the changing is absorbed by controlling the regenerative braking torque. Therefore, total braking torque can be maintained constant. In this situation, the regenerative braking torque is not controlled to the most efficient generating value, but the maximum value of power generation becomes small and the most efficient generating value becomes small while the vehicle's velocity is smaller than the prescribed velocity, as shown FIG. 7. Therefore, significant kinetic energy is not wasted if the regenerative braking torque is not controlled to the most efficient generating value.

As mentioned above, changing from regenerative and hydraulic braking (cooperative braking) to hydraulic braking while reducing the vehicle's velocity is smooth in this present embodiment. Furthermore, the efficiency of regenerating energy can be prevented from being reduced and the operator's feeling can be normal.

Figure 9:
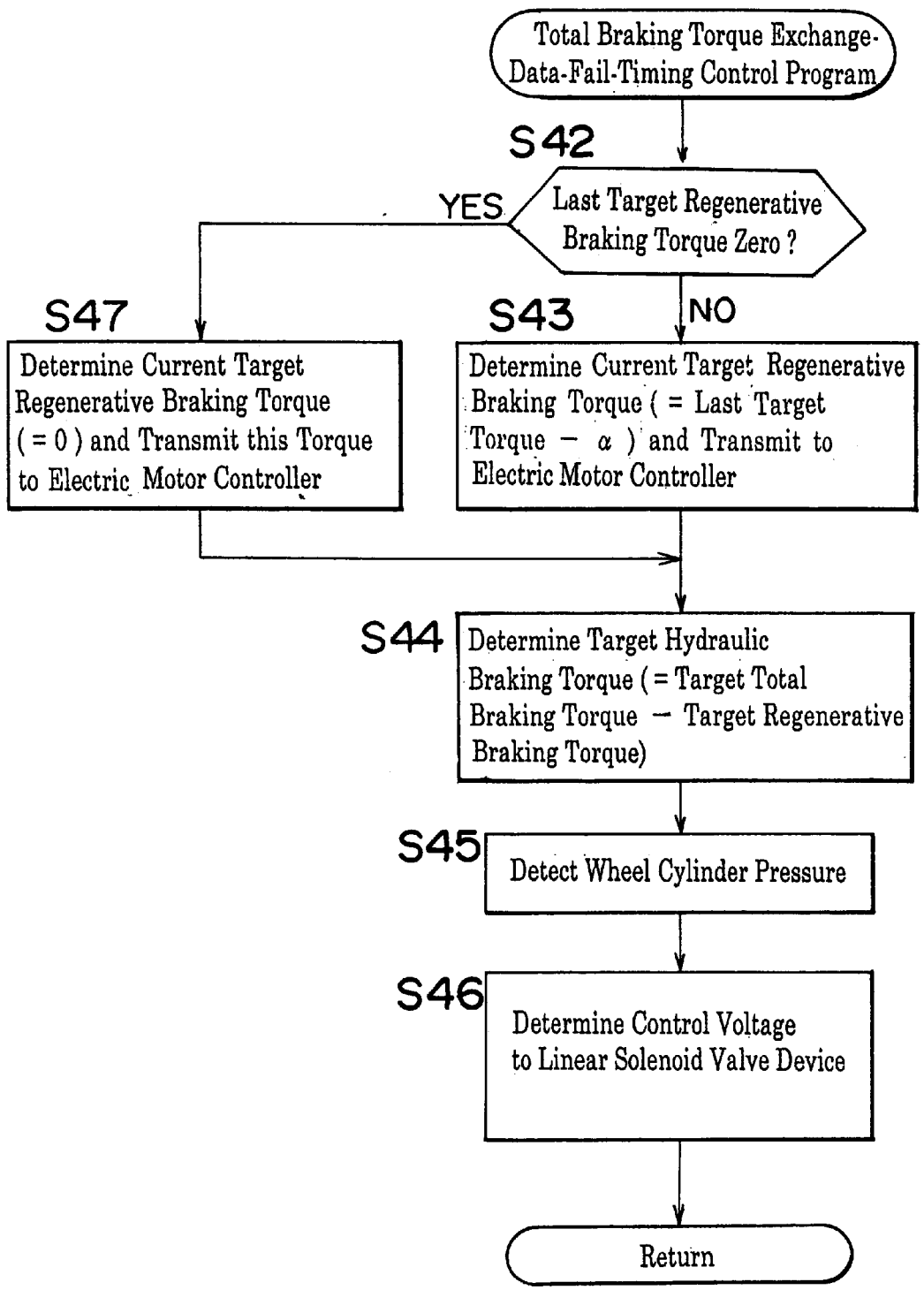
FIG. 9 is a flow chart illustrating a total braking torque exchange-data-fail-timing control program stored in the ROM of the total braking torque controlling device of the braking torque control system of FIG. 1.

While the total braking torque controller 46 cannot normally receive data referring to actual regenerative braking torque transmitted from the electric motor controller 42, total braking torque is controlled on the basis of the total braking torque exchange-data-fail-timing control program illustrated in the flow chart of FIG. 9.

Step S42 decides whether the last target regenerative braking torque was zero. Generally, the target regenerative braking torque is not zero, so the decision is NO and step S43 determines the current target regenerative braking torque by subtracting a fixed value alpha from the last target regenerative braking torque. The current target regenerative braking torque is transmitted to the electric motor controller 42. Step S44 determines the target hydraulic braking torque by subtracting the target regenerative braking torque from the target total braking torque. Thus, the target hydraulic braking torque is gradually increased as the target regenerative braking torque is gradually reduced. Steps S45 and S46 determine the control voltage to be provided to the linear solenoid valve device 56 so that the difference between the target hydraulic braking torque and the hydraulic braking torque corresponding to the pressure detected by the pressure sensor 124 is small.

When the target regenerative braking torque becomes zero because steps S42 through S46 are repeatedly executed, the decision of step S42 becomes YES and step S47 determines the target regenerative braking torque to be zero. The data referring to the target regenerative braking torque, which is zero, is transmitted to the electric motor controller 42. After this, if the decision of step S42 is YES, the target regenerative braking torque is maintained zero. When the target regenerative braking torque is zero, the target hydraulic braking torque determined by step S44 is determined to be the same as the target total braking torque and the vehicle is given only hydraulic braking torque.

The target regenerative braking torque is reduced at the prescribed rate regardless of the target regenerative braking torque at that time (of data exchange failure). In this embodiment, the rate is determined to be a smaller rate than the maximum possible changing rate of the hydraulic braking torque, which can be accurately controlled. That is, the constant rate is determined to be smaller than the maximum possible changing rate by which the regenerative braking torque can be accurately controlled by the regenerative braking torque controller 14.

Figure 12:
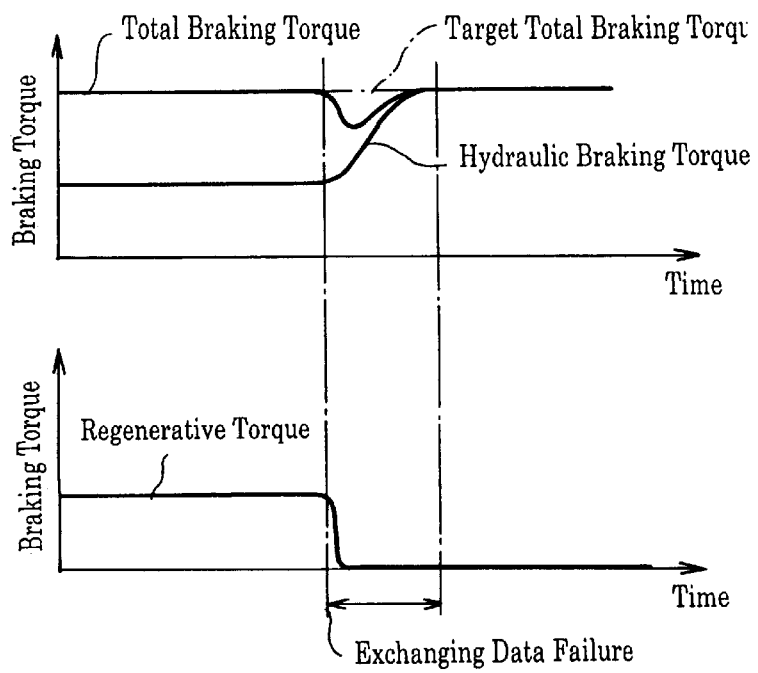
FIG. 12 is a graph indicating a problem of a conventional braking torque control system.

As shown in FIG. 12, the hydraulic braking torque controller 30 cannot increase the hydraulic braking torque as rapidly as the regenerative braking torque controller 14 can decrease the regenerative braking torque. Consequently, if both the target regenerative braking torque and the target hydraulic braking torque are changed at the maximum changing rate of the regenerative braking torque controlled by the regenerative braking torque controller 14, the actual regenerative braking torque can be reduced on target, but the hydraulic braking torque cannot be increased at the target rate. Accordingly, the total braking torque cannot be maintained constant in spite of the fact that the target total braking torque is held constant. Therefore, the operator does not feel as if it is operating the conventional braking system. In contrast, if the target regenerative braking torque is reduced at the smaller rate (no greater than the maximum possible changing rate of the hydraulic system) and the target hydraulic braking torque is increased at the same rate, the actual hydraulic braking torque can be increased at the target rate, so that total braking torque can be maintained constant. Therefore, the operator feels as if it is operating the conventional braking system. In this embodiment, the constant rate is set to be a smaller rate than the maximum possible changing rate of the hydraulic braking torque controlled by the hydraulic braking torque controller 30.

Figure 11:
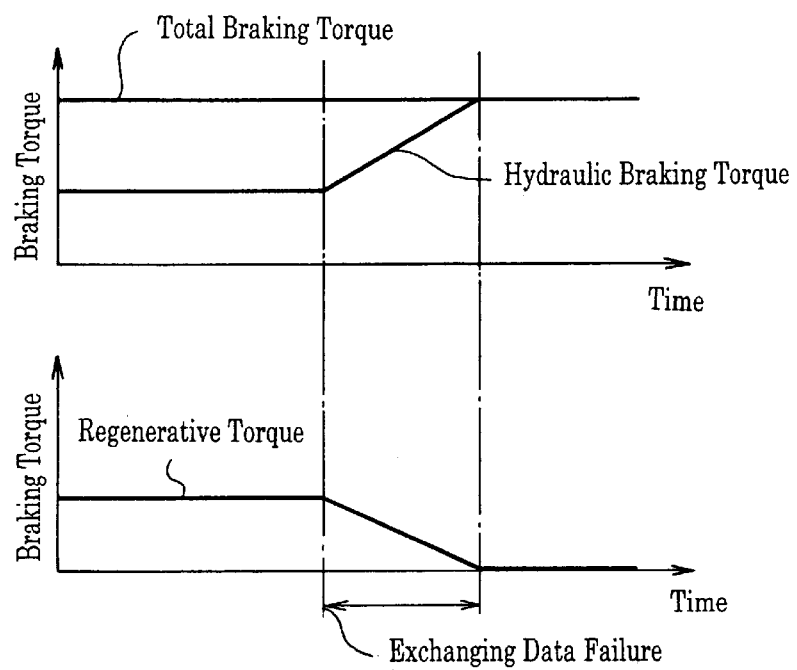
FIG. 11 is a graph indicating one example of control in the braking torque control system of FIG. 1.

One example of controlling during the exchange-data-fail-timing control is indicated in FIG. 11. Since the changing rates of both the target regenerative braking torque (reducing rate) and the target hydraulic braking torque (increasing rate) are set to be smaller than the maximum possible changing rate of the hydraulic braking torque controlled by the hydraulic braking torque controller 30, the actual reducing rate of the regenerative braking torque and the actual increasing rate of the hydraulic braking torque can be the same. As a result, if operating power of the brake pedal 76 is constant, total braking torque can be maintained constant and the operator's feeling can be normal. Furthermore, total braking torque can be more accurately controlled, and changing from regenerative and hydraulic braking to hydraulic braking is smoother than in the case when regenerative braking torque is rapidly reduced.

If during normal regenerative braking control, the electric motor controller 42 cannot normally receive data referring to the target regenerative braking torque, step S52 of the flow chart in FIG. 10 and subsequent steps are executed. Step S52 decides whether the last controlling value provided to the inverter 40 was zero. Generally, the value is not zero, and then step S53 determines the current controlling value by subtracting a fixed value beta from the last controlling value. Step S10 calculates the actual regenerative braking torque on the basis of revolution of the electric motor 28 the same way as during the normal-control. Data referring to the actual regenerative braking torque is transmitted to the total braking torque controller 46. The data referring to the actual regenerative braking torque indicates the result of controlling based on the last controlling value and does not indicate the result of controlling based on the current controlling value. Therefore, the total braking torque controller 46 is transmitted the data in delay, but this is not significant.

When the controlling value becomes zero because of repeated reduction of the regenerative braking torque, the decision of step S52 is YES, and the value is maintained to zero (step S54). Regenerative braking torque is zero and rotating of the wheel is reduced by only hydraulic braking torque.

The controlling value is reduced so that regenerative braking torque is reduced at the same rate as the increasing rate of the hydraulic braking torque as mentioned above. If the electric motor controller 42 cannot normally receive date referring to the target regenerative braking torque, regenerative braking torque is automatically reduced at the constant rate.

If the total braking torque controller 46 can normally receive data referring to the actual regenerative braking torque transmitted from the electric motor controller 42, the decision of step S3 is NO and the normal-control is executed. As mentioned above, target hydraulic braking torque is determined by subtracting the actual regenerative braking torque corresponding to the data transmitted from the electric motor controller 42 from the target total braking torque, and the control voltage to be provided to the linear solenoid valve device 56 is determined. The total braking torque controller 46 transmits data referring to the target regenerative braking torque to the electric motor controller 42, but the electric motor controller 42 cannot normally receive the data. Therefore, regenerative braking torque is not controlled to be the torque corresponding to the transmitted target data. In contrast, because the total braking torque controller 46 can normally receive data referring to the actual regenerative braking torque, hydraulic braking torque can be controlled based on the actual regenerative braking torque and total braking torque can be controlled accurately.

If the total braking torque controller 46 cannot normally receive data referring to the actual regenerative braking torque transmitted from the electric motor controller 42, the decision of step S3 is YES, and the total braking torque exchange-data-fail-timing control is executed. Steps S43, S44 gradually reduce the target regenerative braking torque and the target hydraulic braking torque is gradually increased. In this situation, the regenerative braking torque controller 14 reduces the regenerative braking torque at the constant rate and the hydraulic braking torque controller 30 increases the hydraulic braking torque at the constant rate, independently. The constant rate (the values of alpha and beta) is set beforehand, so the total braking torque can be maintained constant and the operator feels as if it is operating the conventional braking system. In this way, if receiving data at both controllers 42, 46 are abnormal, controlling total braking torque is good and changing from regenerative and hydraulic braking to hydraulic braking is smooth.

As mentioned above, the braking torque control system of this embodiment can control total braking torque without drawbacks, if exchanging data between the total braking torque controller 46 and the electric motor controller 42 fails. In this situation, the regenerative braking torque is gradually reduced and the vehicle is given only hydraulic braking torque. The reducing rate of the regenerative braking torque is less than the maximum possible changing rate, so if the operating power for the brake pedal 76 is constant, total braking torque is maintained constant and controllability is prevented from being reduced. Therefore, the operator feels as if it is operating the conventional braking system. When the vehicle's velocity is less than the prescribed velocity or exchanging data fails, changing from regenerative and hydraulic braking to hydraulic braking is smooth and controlling total braking torque is good.

In this embodiment, the portion of the total braking torque controller 46 that executes the total braking torque normal-control program functions as a priority regenerative braking torque controlling device. A portion of the total braking torque controller 46 that executes the total braking torque before-stop-control program functions as a priority hydraulic braking torque controlling device. The priority-hydraulic braking torque controlling device also functions as an exchanging-data-fail-timing hydraulic braking torque-increasing device. A portion of the total braking torque controller 46 that executes the total braking torque switching program functions as a total braking torque switching control device. The total braking torque switching control device functions as a regenerative braking reducing-timing switching control device, a vehicle's velocity reducing-timing switching control device and a motor's revolution reducing-timing switching control device.

A portion of the total braking torque controller 46 that controls hydraulic braking torque, functions as a hydraulic braking torque controller for the frictional braking generator. The electric motor controller 42 and so on function as the regenerative braking torque generator. The regenerative braking torque-reducing device is the portion of the total braking torque controller 46 and the regenerative braking torque controller 14 that execute step S43. The regenerative braking torque-reducing device also functions as a regenerative braking torque-gradually-reducing device, a constant rate reducing device, a receiving-data-fail-timing constant rate reducing device, and an exchanging-data-fail-timing hydraulic braking torque-increasing device.

In the above embodiment, the electric motor controller 42, which functions as the regenerative braking torque generator, is part of the regenerative braking torque controller 14. However, the functions of the electric motor controller 42 may be performed by other hardware. Similarly, the functions performed by the total braking torque controller 46 may be performed in hardware other than the hydraulic braking torque controller 30.

For example, the functions of determining the target total braking torque, the target regenerative braking torque and the target hydraulic braking torque can be performed in the electric motor controller 42, rather than in the total braking torque controller 46, as is primarily done in the preferred embodiment.

Furthermore, in the above embodiment, when the before-stop-control or the exchanging-data-fail-timing control is executed, regenerative braking torque is gradually reduced. However, the reducing rate can be more rapid (although, as noted above, the system may suffer from total braking torque fluctuation). Additionally, in the case of gradually reducing, the way of reducing can be continuous or step-by-step. It is unnecessary to reduce at a constant rate. Rather, the reducing rate can be determined based on target total braking torque (operating power), deceleration of the vehicle, or actual hydraulic braking torque (pressure of the wheel cylinder).

Furthermore, data transmitted from the electric motor controller 42 to the total braking torque controller 46 can refer not only to actual regenerative braking torque, but can also refer to the controlling value to be provided to the inverter 40 from the electric motor controller. If data referring to the controlling value are transmitted, the total braking torque controller can reduce the regenerative braking torque more quickly because it is unnecessary to consider the delay time between a timing of determining the controlling value and a timing of detecting actual regenerative braking torque controlled on the basis of the controlling value. The data can be non-process data of revolution of the electric motor 28, and can be transmitted from the encoder 260 directly to the total braking torque controller 46, not through the electric motor controller 42. In this case, the total braking torque controller 46 calculates actual regenerative braking torque on the basis of revolution of the electric motor 28.

Furthermore, in above embodiment target total braking torque is desired by the vehicle operator, but it also can be optimum braking torque logically determined on the basis of the relationship between coefficient of road surface friction and the movable load.

The control voltage to the linear solenoid valve device 56 is controlled according to the theory of feedback control, but it can also be controlled according to the theory of feed forward control or according to both theories.

The frictional braking torque generator can be an electric braking torque controller that drives an electric motor, or a piezoelectric braking torque controller that drives by deformation of material caused by applying voltage, instead of the described hydraulic braking torque controller.

Furthermore, in the above embodiment, step S3 or step S8 detects that receiving data has failed when at least one condition among the conditions (1), (2) and (3) is met, but it also can detect failure when two or more conditions among the conditions (1), (2) and (3) are met or when at least one or more conditions among the conditions (1), (2) and (3) are met two or more times continuously. The base data detecting of whether the conditions are met or not, can be non-process data or smoothed data, e.g., a mean value.

Furthermore, in the above embodiment, when the vehicle's velocity becomes less than the prescribed velocity or when the rate of reducing the regenerative braking torque exceeds a limit, a priority regenerative braking control is changed to a priority-hydraulic-braking control. It can be changed when reduction of the speed of the target regenerative braking torque or when reduction of the speed of the actual regenerative braking torque exceeds a prescribed reducing speed (rate of change), or when the regenerative braking torque becomes smaller than a fixed value. The prescribed velocity can correspond to the revolution N0 of the electric motor, or it can correspond to a larger revolution than the revolution N0. In this case, the priority regenerative braking torque control can be changed to the priority hydraulic braking torque control when the reducing rate of the regenerative braking torque becomes larger than the constant rate, that is, when it becomes difficult to maintain controllability of total braking torque. Then, controllability of the total braking torque is maintained high. The priority regenerative braking torque control can be changed to the priority hydraulic braking torque control based on other conditions.

Furthermore, in the above embodiment, if exchanging of data fails, the program illustrated as the flow chart in FIG. 9 is selected. However, the total braking torque before-stop-control program in FIG. 6 can be also selected. Hydraulic braking torque can be increased by executing the priority hydraulic braking torque in failure of exchanging data. In that case, regenerative braking torque can be reduced.

As noted above, the controller that controls the regenerative braking torque generator and the frictional braking torque generator can be distributed between these two generators, or can be a separate device. The controller can be one or more programmed general purpose computers, one or more ASICs or a combination of both.

While the present invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A braking torque control system for a wheeled vehicle, comprising:

a regenerative braking torque generator that provides regenerative braking torque to the wheels by a regenerative brake action of an electric motor connected to the wheels;

a frictional braking torque generator that provides frictional braking torque to the wheels by pressing friction devices against brake elements that rotate with the wheels; and a controller that controls the regenerative braking torque generator and the frictional braking torque generator to provide a total braking torque, which is a combination of the regenerative braking torque and the frictional braking torque, on the basis of data exchanging between the regenerative braking torque generator and the frictional braking torque generator, the controller reducing the regenerative braking torque generated by the regenerative braking torque generator when there is a failure in the data exchanging.

2. The braking torque control system according to claim 1, wherein:

the regenerative braking torque generator includes a regenerative braking torque subordinate controller that controls the regenerative braking torque based on data supplied from the frictional braking torque generator;

the frictional braking torque generator includes a frictional braking torque subordinate controller that controls the frictional braking torque based on data supplied from the regenerative braking torque generator; and the controller includes a data exchanging fail-detecting device that detects whether the data exchanging between the regenerative braking torque subordinate controller and the frictional braking torque subordinate controller has failed.

3. The braking torque control system according to claim 1, wherein:

the regenerative braking torque generator includes the electric motor connected to the wheels, a battery that supplies power to the electric motor, an inverter installed between the battery and the electric motor and a motor controller that controls a braking torque of the electric motor by controlling the inverter in order to provide the regenerative braking torque to the wheels;

the frictional braking torque generator includes a frictional brake that presses a brake pad against the brake element that rotates with the wheels, a pressure controller that controls a pressure of the brake pad pressing against the brake element in order to provide the frictional braking torque to the wheel; and the controller includes a controller data exchanging fail-detecting device that detects whether the data exchanging between the motor controller and the pressure controller has failed.

4. The braking torque control system according to claim 1, wherein:

the controller gradually reduces the regenerative braking torque; and the frictional braking torque generator includes a frictional braking torque controller that controls the frictional braking torque so that the frictional braking torque reaches the total braking torque on the basis of brake operating power provided by an operator.

5. The braking torque control system according to claim 4, wherein the controller determines a changing rate of the regenerative braking torque to be no greater than a maximum possible changing rate of the frictional braking torque and smaller than a maximum possible changing rate of the regenerative braking torque.

6. The braking torque control system according to claim 1, wherein:

the controller gradually reduces the regenerative braking torque; and the frictional braking torque generator gradually increases the frictional braking torque at a changing rate that is the same as a changing rate of the regenerative braking torque.

7. The braking torque control system according to claim 1, wherein:

the regenerative braking torque generator includes a regenerative braking torque target-controller that controls the regenerative braking torque to reach a target regenerative braking torque on the basis of data referring to the target regenerative braking torque;

the frictional braking torque generator includes a hydraulic-braking-torque-actual-controller that controls the frictional braking torque based on data referring to an actual regenerative braking torque transmitted from the regenerative braking torque generator; and the controller reduces the regenerative braking torque at a prescribed rate when there is a failure to receive the data referring to the target regenerative braking torque.

8. The braking torque control system according to claim 1, wherein:

the regenerative braking torque generator includes a regenerative braking torque subordinate controller that controls the regenerative braking torque to reach a target regenerative braking torque based on data from the frictional braking torque generator;

the frictional braking torque generator includes a frictional braking torque subordinate controller that controls the frictional braking torque based on data referring to an actual regenerative braking torque transmitted from the regenerative braking torque generator; and the controller reduces a value of data referring to the target regenerative braking torque transmitted to the regenerative braking torque generator when the frictional braking torque generator does not correctly receive the data referring to the actual regenerative braking torque.

9. The braking torque control system according to claim 1, wherein the frictional braking torque generator includes a hydraulic actuator that presses a brake pad against the brake element by hydraulic pressure.

10. The braking torque control system according to claim 1, wherein the controller reduces the regenerative braking torque generated by the regenerative braking torque generator and increases the frictional braking torque generated by the frictional braking torque generator when there is failure of the data exchanging.

11. A braking torque control system for a wheeled vehicle, comprising:

a regenerative braking torque generator that provides regenerative braking torque to the wheels by a regenerative brake action of an electric motor connected to the wheels;

a frictional braking torque generator that provides frictional braking torque to the wheels by pressing friction devices against brake elements that rotate with the wheels; and a controller that controls the regenerative braking torque generator and the frictional braking torque generator to provide a total braking torque, which is a combination of the regenerative braking torque and the frictional braking torque, on the basis of data exchanging between the regenerative braking torque generator and the frictional braking torque generator, the controller increasing the frictional braking torque generated by the frictional braking torque generator when there is a failure in the data exchanging.

12. A braking torque control system for a wheeled vehicle, comprising:

a regenerative braking torque generator that provides regenerative braking torque to the wheels by a regenerative brake action of an electric motor connected to the wheels;

a frictional braking torque generator that provides frictional braking torque to the wheels by pressing friction devices against brake elements that rotate with the wheels; and a controller that controls the regenerative braking torque generator and the frictional braking torque generator to provide a total braking torque, which is a combination of the regenerative braking torque and the frictional braking torque, on the basis of data exchanging between the regenerative braking torque generator and the frictional braking torque generator, the controller being selectively operative in (a) a priority-regenerative braking torque controlling mode in which the frictional braking torque is controlled based on the regenerative braking torque and (b) a priority-frictional-braking torque controlling mode in which the regenerative braking torque is controlled based on increasing the frictional braking torque; the controller switching from the priority-regenerating braking torque controlling mode to the priority-frictional braking torque controlling mode when there is a failure of the data exchanging.

13. The braking torque control system according to claim 12, wherein the priority-frictional braking torque controlling mode increases the frictional braking torque at a constant rate.

14. A braking torque control system for a wheeled vehicle, comprising:
a regenerative braking torque generator that provides regenerative braking torque to the wheels by a regenerative brake action of an electric motor connected to the wheels;

a frictional braking torque generator that provides frictional braking torque to the wheels by pressing friction devices against brake elements that rotate with the wheels; and a controller that controls the regenerative braking torque generator and the frictional braking torque generator to provide a total braking torque, which is a combination of the regenerative braking torque and the frictional braking torque, the controller prohibiting the regenerative braking torque generated by the regenerative braking torque generator from being reduced at a changing rate that is greater than a maximum possible changing rate of the frictional braking torque, said maximum possible changing rate of the frictional braking torque being smaller than a maximum possible changing rate of the regenerative braking torque.

15. A method of controlling braking torque for a wheeled vehicle, comprising the steps of:
providing regenerative braking torque to the wheels by a regenerative brake action of an electric motor connected to the wheels;

providing frictional braking torque to the wheels by pressing friction devices against brake elements that rotate with the wheels; and controlling a total braking torque, which is a combination of the regenerative braking torque and the frictional braking torque, on the basis of data exchanging between a regenerative braking torque generator and a frictional braking torque generator, wherein the regenerative braking torque is reduced when there is a failure in the data exchanging.

16. The method according to claim 15, wherein:
when there is a failure in the data exchanging, the regenerative braking torque is gradually reduced; and
the frictional braking torque is controlled to reach the total braking torque on the basis of brake operating power provided by an operator.

17. The method according to claim 16, wherein a changing rate of the regenerative braking torque is controlled to be no greater than a maximum possible changing rate of the frictional braking torque and smaller than a maximum possible changing rate of the regenerative braking torque.

18. The method according to claim 15, wherein:
when there is a failure in the data exchanging, the regenerative braking torque is gradually reduced; and
the frictional braking torque is gradually increased at a changing rate that is the same as a changing rate of the regenerative braking torque.

19. A method of controlling braking torque for a wheeled vehicle, comprising the steps of:
providing regenerative braking torque to the wheels by a regenerative brake action of an electric motor connected to the wheels;

providing frictional braking torque to the wheels by pressing friction devices on brake elements that rotate with the wheels; and controlling a total braking torque, which is a combination of the regenerative braking torque and the frictional braking torque, on the basis of data exchanging between a regenerative braking torque generator and a frictional braking torque generator, wherein the frictional braking torque is increased when there is a failure in the data exchanging.

20. A method of controlling braking torque for a wheeled vehicle, comprising the steps of:
providing regenerative braking torque to the wheels by a regenerative brake action of an electric motor connected to the wheels;

providing frictional braking torque to the wheels by pressing friction devices on brake elements that rotate with the wheels; and controlling a total braking torque, which is a combination of the regenerative braking torque and the frictional braking torque, on the basis of data exchanging between a regenerative braking torque generator and a frictional braking torque generator, by selectively operating in (a) a priority-regenerative braking torque controlling mode in which the frictional braking torque is controlled based on the regenerative braking torque and (b) a priority-frictional-braking braking torque controlling mode in which the regenerative braking torque is controlled based on increasing the frictional braking torque; and switching from the priority-regenerating braking torque controlling mode to the priority-frictional braking torque controlling mode when there is a failure of the data exchanging.

21. The method according to claim 20, wherein the priority-frictional braking torque controlling mode increases the frictional braking torque at a constant rate.

22. A method of controlling braking torque for a wheeled vehicle, comprising the steps of:
providing regenerative braking torque to the wheels by a regenerative brake action of an electric motor connected to the wheels;

providing frictional braking torque to the wheels by pressing friction devices against brake elements that rotate with the wheels; and controlling a total braking torque, which is a combination of the regenerative braking torque and the frictional braking torque, wherein the regenerative braking torque generated by the regenerative braking torque generator is prohibited from being reduced at a changing rate that is greater than a maximum possible changing rate of the frictional braking torque, said maximum possible changing rate of the frictional braking torque being smaller than a maximum possible changing rate of the regenerative braking torque.

* * * * *